United States Patent
Julian et al.

(10) Patent No.: US 11,661,075 B2
(45) Date of Patent: May 30, 2023

(54) INWARD/OUTWARD VEHICLE MONITORING FOR REMOTE REPORTING AND IN-CAB WARNING ENHANCEMENTS

(71) Applicant: NETRADYNE, INC., San Diego, CA (US)

(72) Inventors: David Jonathan Julian, San Diego, CA (US); Venkata Sreekanta Reddy Annapureddy, San Diego, CA (US); Sandeep Pandya, San Diego, CA (US); Arvind Yedla, San Diego, CA (US); Dale Alan Willis, San Diego, CA (US); Venkata Ramanan Venkatachalam Jayaraman, San Diego, CA (US); Suresh Babu Yanamala, San Diego, CA (US); Avneesh Agrawal, San Diego, CA (US); Veeresh Taranalli, San Diego, CA (US); Jaeyoon Kim, San Diego, CA (US)

(73) Assignee: NETRADYNE, INC., San Diego, CA (US)

( * ) Notice: Subject to any disclaimer, the term of this patent is extended or adjusted under 35 U.S.C. 154(b) by 0 days.

(21) Appl. No.: 17/275,237

(22) PCT Filed: Sep. 11, 2019

(86) PCT No.: PCT/US2019/050600
§ 371 (c)(1),
(2) Date: Mar. 11, 2021

(87) PCT Pub. No.: WO2020/055992
PCT Pub. Date: Mar. 19, 2020

(65) Prior Publication Data
US 2021/0394775 A1 Dec. 23, 2021

Related U.S. Application Data

(60) Provisional application No. 62/729,994, filed on Sep. 11, 2018.

(51) Int. Cl.
*B60W 50/14* (2020.01)
*G06V 20/58* (2022.01)
(Continued)

(52) U.S. Cl.
CPC ............ *B60W 50/14* (2013.01); *B60W 40/02* (2013.01); *B60W 40/08* (2013.01); *G06V 20/58* (2022.01);
(Continued)

(58) Field of Classification Search
CPC ...... B60W 50/14; B60W 40/02; B60W 40/08; B60W 2420/42; B60W 2520/00;
(Continued)

(56) References Cited

U.S. PATENT DOCUMENTS

| | | | | |
|---|---|---|---|---|
| 2010/0073194 A1* | 3/2010 | Ghazarian | ........ | G08G 1/096783 340/901 |
| 2011/0169625 A1* | 7/2011 | James | ................. | B60W 30/095 340/439 |

(Continued)

OTHER PUBLICATIONS

International Search Report and Written Opinion issued in International Application No. PCT/US2019/050600 dated Nov. 26, 2019.

(Continued)

*Primary Examiner* — Mohamed Barakat
(74) *Attorney, Agent, or Firm* — Foley & Lardner LLP

(57) ABSTRACT

Systems and methods are provided for intelligent driving monitoring systems, advanced driver assistance systems and autonomous driving systems, and providing alerts to the driver of a vehicle, based on anomalies detected between driver behavior and environment captured by the outward facing camera. Various aspects of the driver, which may include his direction of sight, point of focus, posture, gaze, is determined by image processing of the upper visible body of the driver, by a driver facing camera in the vehicle. Other (Continued)

aspects of environment around the vehicle captured by the multitude of cameras in the vehicle are used to correlate driver behavior and actions with what is happening outside to detect and warn on anomalies, prevent accidents, provide feedback to the driver, and in general provide a safer driver experience.

21 Claims, 22 Drawing Sheets

(51) Int. Cl.
| | |
|---|---|
| *G06V 40/16* | (2022.01) |
| *G06V 20/59* | (2022.01) |
| *G06V 40/19* | (2022.01) |
| *B60W 40/02* | (2006.01) |
| *B60W 40/08* | (2012.01) |
| *G08G 1/16* | (2006.01) |

(52) U.S. Cl.
CPC .......... *G06V 20/597* (2022.01); *G06V 40/165* (2022.01); *G06V 40/19* (2022.01); *G08G 1/164* (2013.01); *B60W 2420/42* (2013.01); *B60W 2520/00* (2013.01); *B60W 2540/225* (2020.02); *B60W 2540/229* (2020.02); *B60W 2552/53* (2020.02); *B60W 2554/404* (2020.02); *B60W 2555/60* (2020.02)

(58) Field of Classification Search
CPC ..... B60W 2540/225; B60W 2540/229; B60W 2552/53; B60W 2554/404; B60W 2555/60; G06V 20/58; G06V 20/597; G06V 40/165; G06V 40/19; G08G 1/164
See application file for complete search history.

(56) References Cited

U.S. PATENT DOCUMENTS

| | | | |
|---|---|---|---|
| 2012/0300061 A1 | 11/2012 | Osman et al. | |
| 2014/0005886 A1* | 1/2014 | Morris | G02B 27/01 |
| | | | 701/36 |
| 2014/0125474 A1 | 5/2014 | Gunaratne | |
| 2016/0001781 A1* | 1/2016 | Fung | G16H 50/20 |
| | | | 701/36 |
| 2016/0101729 A1 | 4/2016 | Burke | |
| 2016/0137142 A1 | 5/2016 | Nemat-Nasser et al. | |
| 2016/0267335 A1* | 9/2016 | Hampiholi | B60K 28/06 |
| 2017/0053555 A1 | 2/2017 | Angel et al. | |
| 2020/0207358 A1* | 7/2020 | Katz | G06F 3/017 |
| 2020/0254876 A1* | 8/2020 | Cordell | G06T 7/70 |

OTHER PUBLICATIONS

Supplementary European Search Report on EP 19860892.9 dated May 31, 2022 (9 pages).
International Search Report and Written Opinion on PCT/US2021/15909 dated Apr. 14, 2021 (8 pages).
Intellectual Property Office of India, Exam Report on IN Appl. Ser. No. 202117016731 dated Oct. 17, 2022 (8 pages).

* cited by examiner

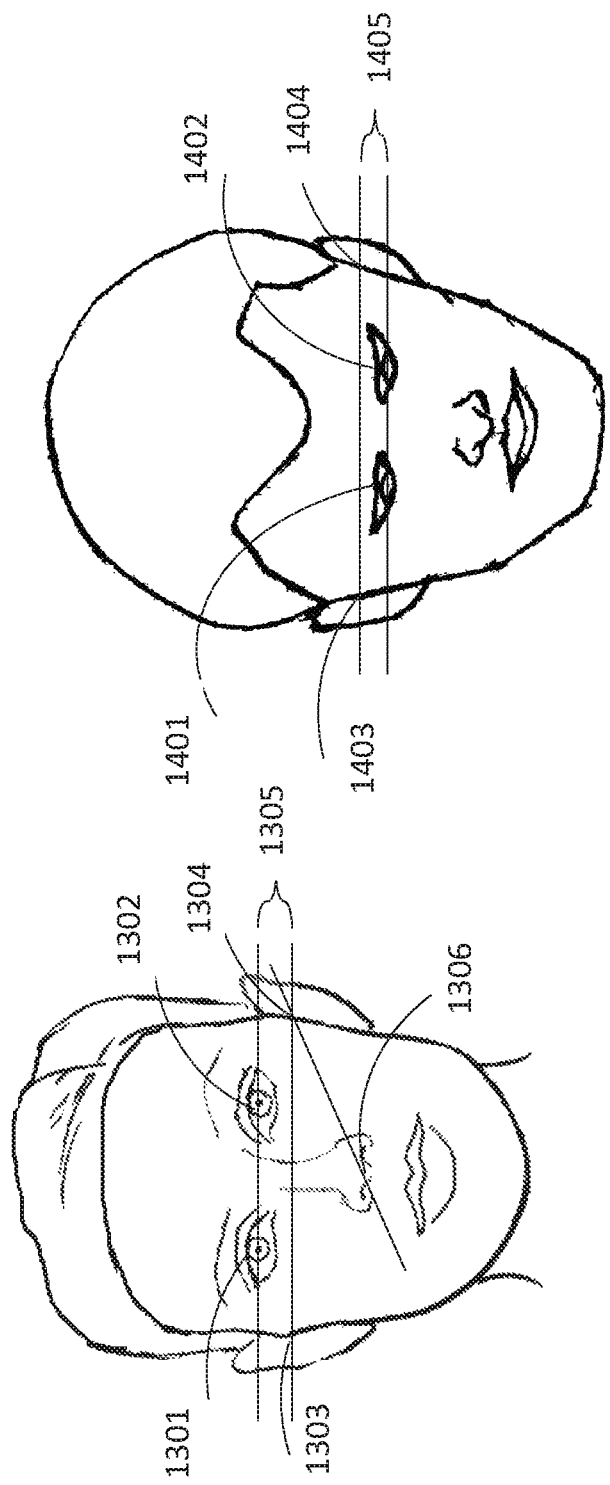

INWARD/OUTWARD VEHICLE MONITORING FOR REMOTE REPORTING AND IN-CAB WARNING ENHANCEMENTS

CROSS-REFERENCE TO RELATED APPLICATION

This application is a U.S. National Phase Application of International Application No. PCT/US2019/050600, filed Sep. 11, 2019, which claims the benefit of U.S. Provisional Patent Application No. 62/729,994, filed Sep. 11, 2018, the entire contents of which are hereby incorporated by reference in their entirety.

BACKGROUND

Field

Certain aspects of the present disclosure generally relate to intelligent driving monitoring systems (IDMS), driver monitoring systems, advanced driver assistance systems (ADAS), and autonomous driving systems, and more particularly to systems and methods for determining and/or providing reporting to the aforementioned systems and/or alerts to an operator of a vehicle.

Background

Vehicles, such as automobiles, trucks, tractors, motorcycles, bicycles, airplanes, drones, ships, boats, submarines, and others, are typically operated and controlled by human drivers. Through training and with experience, a human driver may learn how to drive a vehicle safely and efficiently in a range of conditions or contexts. For example, as an automobile driver gains experience, he may become adept at driving in challenging conditions such as rain, snow, or darkness.

Drivers may sometimes drive unsafely or inefficiently. Unsafe driving behavior may endanger the driver and other drivers and may risk damaging the vehicle. Unsafe driving behaviors may also lead to fines. For example, highway patrol officers may issue a citation for speeding. Unsafe driving behavior may also lead to accidents, which may cause physical harm, and which may, in turn, lead to an increase in insurance rates for operating a vehicle. Inefficient driving, which may include hard accelerations, may increase the costs associated with operating a vehicle.

The types of monitoring available today, however, may be based on sensors and/or processing systems that do not provide context to a traffic event. For example, an accelerometer may be used to detect a sudden deceleration associated with a hard-stopping event, but the accelerometer may not be aware of the cause of the hard-stopping event. Accordingly, certain aspects of the present disclosure are directed to systems and methods of driver monitoring that may incorporate context as part of detecting positive, neutral, or negative driving actions.

SUMMARY

Certain aspects of the present disclosure provide a method. The method includes capturing, by at least one processor of a computing device with an outward facing camera, first visual data of an outward scene outside of a vehicle. The method further includes determining, by the at least one processor based on the first visual data, a potentially unsafe driving condition outside of the vehicle and an amount of time in which the vehicle will encounter the potentially unsafe driving condition. The method further includes capturing, by the at least one processor with a driver facing camera, second visual data of a driver of the vehicle. The method further includes determining, by the at least one processor based on the second visual data, whether a direction in which the driver is looking is toward to the potentially unsafe driving condition or away from the potentially unsafe driving condition. The method further includes transmitting, by the at least one processor to a remote server, a remote alert in response to determining the potentially unsafe driving condition and the direction in which the driver is looking such that: when the driver is determined to be looking away from the potentially unsafe driving condition the remote alert is transmitted in response to determining that the amount of time in which the vehicle will encounter the potentially unsafe driving condition is at or below a first threshold of time, when the driver is determined to be looking toward the potentially unsafe driving condition the remote alert is transmitted in response to determining that the amount of time in which the vehicle will encounter the potentially unsafe driving condition is at or below a second threshold of time, and the first threshold of time is greater than the second threshold of time.

Certain aspects of the present disclosure provide a method. The method includes capturing, by at least one processor of a computing device with an outward facing camera, first visual data of an outward scene outside of a vehicle. The method further includes determining, by the at least one processor based on the first visual data, a potentially unsafe driving condition outside of the vehicle and an amount of time in which the vehicle will encounter the potentially unsafe driving condition. The method further includes capturing, by the at least one processor with a driver facing camera, second visual data of a driver of the vehicle. The method further includes determining, by the at least one processor based on the second visual data, whether a direction in which the driver is looking is toward to the potentially unsafe driving condition or away from the potentially unsafe driving condition. The method further includes activating, by the at least one processor, an in-vehicle alert in response to determining the potentially unsafe driving condition, that the driver is looking away from the potentially unsafe driving condition, and that the amount of time in which the vehicle will encounter the potentially unsafe driving condition is at or below a first threshold of time. The method further includes transmitting, by the at least one processor to a remote server, a remote alert in response to a determination that the driver does not look toward the potentially unsafe driving condition after the in-vehicle alert is activated and that the driver does not prevent the vehicle from reaching a point where the amount of time in which the vehicle will encounter the potentially unsafe driving condition is at or below a second threshold of time. The first threshold of time is greater than the second threshold of time.

Certain aspects of the present disclosure provide a method. The method includes capturing, by at least one processor of a computing device with an outward facing camera, first visual data of an outward scene outside of a vehicle. The method further includes determining, by the at least one processor based on the first visual data, a potentially unsafe driving condition outside of the vehicle and an amount of time in which the vehicle will encounter the potentially unsafe driving condition. The method further includes capturing, by the at least one processor with a driver facing camera, second visual data of a driver of the vehicle. The method further includes determining, by the at least one processor based on the second visual data, whether the driver has looked in a direction of the potentially unsafe driving condition within a predetermined threshold of time of the determination of unsafe driving condition. An in-vehicle alert is suppressed when the driver has looked in the direction of the potentially unsafe driving condition within the predetermined threshold of time. An in-vehicle alert is activated when the driver has not looked in the direction of the potentially unsafe driving condition within the predetermined threshold of time.

Certain aspects of the present disclosure generally relate to providing, implementing, and using a method for determining and/or providing alerts to an operator of a vehicle. The methods may involve a camera sensor and/or inertial sensors to detect traffic events, as well analytical methods that may determine an action by a monitored driver that is responsive to the detected traffic event, traffic sign, and the like.

Certain aspects of the present disclosure provide a method. The method generally includes determining an indication of an inward driving scene complexity; adjusting at least one safety threshold based on the determined indication; and determining a potentially unsafe driving maneuver or situation based on the at least one safety threshold.

Certain aspects of the present disclosure provide a system. The system generally includes a memory and a processor coupled to the memory. The processor is configured to determine an indication of an inward driving scene complexity; adjusting at least one safety threshold based on the determined indication; and determining a potentially unsafe driving maneuver or situation based on that at least one safety threshold.

Certain aspects of the present disclosure provide a non-transitory computer readable medium having instructions stored thereon. Upon execution, the instructions cause the computing device to perform operations comprising determining an indication of an inward driving scene complexity; adjusting at least one safety threshold based on the determined indication; and determining a potentially unsafe driving maneuver or situation based on that at least one safety threshold.

Certain aspects of the present disclosure provide a method. The method generally includes determining an indication of an outward driving scene complexity; adjusting at least one safety threshold based on the determined indication; and determining a potentially unsafe driving maneuver or situation based on the at least one safety threshold.

Certain aspects of the present disclosure provide a system. The system generally includes a memory and a processor coupled to the memory. The processor is configured to determine an indication of an outward driving scene complexity; adjusting at least one safety threshold based on the determined indication; and determining a potentially unsafe driving maneuver or situation based on that at least one safety threshold.

Certain aspects of the present disclosure provide a non-transitory computer readable medium having instructions stored thereon. Upon execution, the instructions cause the computing device to perform operations comprising determining an indication of an outward driving scene complexity; adjusting at least one safety threshold based on the determined indication; and determining a potentially unsafe driving maneuver or situation based on that at least one safety threshold.

Certain aspects of the present disclosure provide a system. The system generally includes multiple cameras coupled to an in-vehicle compute device comprising of memory and a processor coupled to the memory, comprising of a non-transitory computer readable medium having instructions stored thereon.

Certain aspects of the present disclosure provide a method. The method generally includes determining keypoints on images captured by the in-vehicle camera. The keypoints may include points in the captured image corresponding to the Eyes, Ears, Nose, and Shoulders of the driver. Upon detection of the keypoints, the in-vehicle compute device may determine gaze direction, head movements, posture of the driver, and the like.

Certain aspects of the present disclosure provide a system. The system generally includes an audio speaker device connected to the in-vehicle compute device consisting of a processor coupled to a memory. The processor is configured to activate the audio device to sound an audible alarm to the driver upon determining anomalies in driver posture or gaze.

Certain aspects of the present disclosure provide a method. The method generally includes determining deviations from straight-ahead gaze based at least in part on images captured by the in-vehicle camera, and activating the audio alarm when the deviations are above a predefined threshold.

BRIEF DESCRIPTION OF DRAWINGS

FIG. 13 illustrates example determined keypoints associated with the eyes and the ears of a driver in accordance with certain aspects of the present disclosure.

FIG. 14 illustrates example determined keypoints associated with the eyes and the ears of a driver that is looking down in accordance with certain aspects of the present disclosure.

DETAILED DESCRIPTION

Figure 1A:
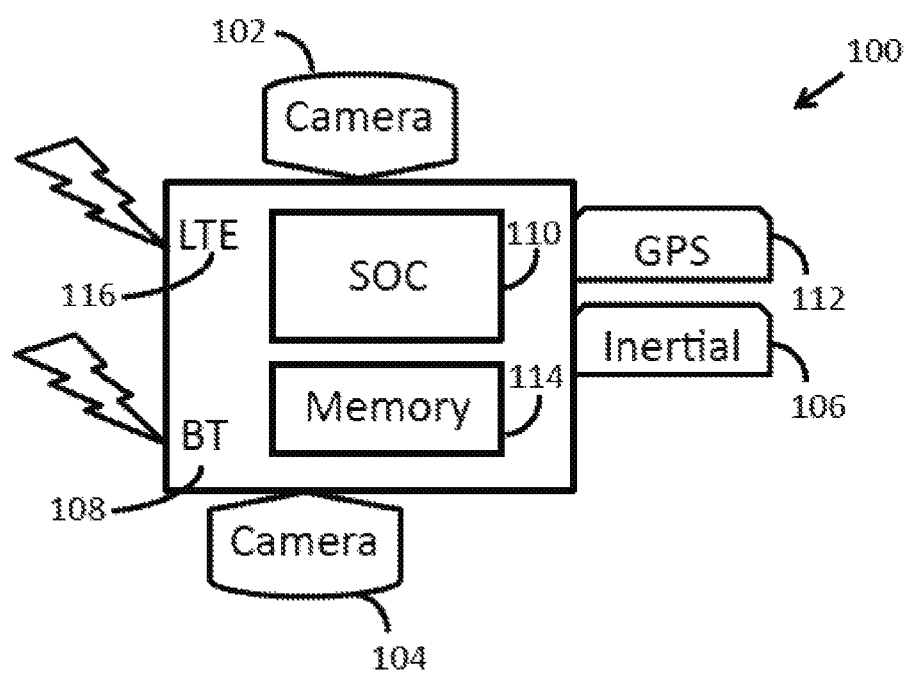
FIG. 1A illustrates a block diagram of an example system for determining, transmitting, and/or providing alerts to an operator of a vehicle and/or a remote driver monitoring system in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Monitoring and Characterization of Driver Behavior

Driving behavior may be monitored. Driver monitoring may be done in real-time or substantially real-time as the driver operates a vehicle, or may be done at a later time based on recorded data. Driver monitoring at a later time may be useful, for example, when investigating the cause of an accident. Driver monitoring in real-time may be useful to guard against unsafe driving, for example, by ensuring that a car cannot exceed a certain pre-determined speed.

The types of monitoring available today, however, may be based on sensors and/or processing systems that do not provide context to a traffic event. For example, an accelerometer may be used to detect a sudden deceleration associated with a hard-stopping event, but the accelerometer may not be aware of the cause of the hard-stopping event. Accordingly, certain aspects of the present disclosure are directed to systems and methods of driver monitoring that may incorporate context as part of detecting positive, neutral, or negative driving actions.

For example, aspects of the present disclosure are directed to methods of monitoring and characterizing driver behavior, which may include methods of determining and/or providing alerts to an operator of a vehicle and/or transmitting remote alerts to a remote driver monitoring system. Remote alerts may be transmitted wirelessly over a wireless network to one or more servers and/or one or more other electronic devices, such as a mobile phone, tablet, laptop, desktop, etc., such that information about a driver and things a driver and their vehicle encounters may be documented and reported to other individuals (e.g., a fleet manager, insurance company, etc.). An accurate characterization of driver behavior has multiple applications. Insurance companies may use accurately characterized driver behavior to influence premiums. Insurance companies may, for example, reward risk mitigating behavior and dis-incentivize behavior associated with increased accident risk. Fleet owners may use accurately characterized driver behavior to incentivize their drivers. Likewise, taxi aggregators may incentivize taxi driver behavior. Taxi or ride-sharing aggregator customers may also use past characterizations of driver behavior to filter and select drivers based on driver behavior criteria. For example, to ensure safety, drivers of children or other vulnerable populations may be screened based on driving behavior exhibited in the past. Parents may wish to monitor the driving patterns of their kids and may further utilize methods of monitoring and characterizing driver behavior to incentivize safe driving behavior.

In addition to human drivers, machine controllers are increasingly being used to drive vehicles. Self-driving cars, for example, include a machine controller that interprets sensory inputs and issues control signals to the car so that the car may be driven without a human driver. As with human drivers, machine controllers may also exhibit unsafe or inefficient driving behaviors. Information relating to the driving behavior of a self-driving car would be of interest to engineers attempting to perfect the self-driving car's controller, to law-makers considering policies relating to self-driving cars, and to other interested parties.

Visual information may improve existing ways or enable new ways of monitoring and characterizing driver behavior. For example, according to aspects of the present disclosure, the visual environment around a driver may inform a characterization of driver behavior. Typically, running a red light may be considered a 'bad' driving behavior. In some contexts, however, such as when a traffic guard is standing at an intersection and using hand gestures to instruct a driver to move through a red light, driving through a red light would be considered 'good' driving behavior. In some contexts, a 'bad' driving behavior, such as tailgating, may not be the fault of the driver. For example, another driver may have pulled into the driver's lane at a potentially unsafe distance ahead of the driver. Visual information may also improve the quality of a characterization that may be based on other forms of sensor data, such as determining a safe driving speed, as described below. The costs of accurately characterizing driver behavior using computer vision methods in accordance with certain aspects of the present disclosure may be less than the costs of alternative methods that use human inspection of visual data. Camera based methods may have lower hardware costs compared with methods that involve RADAR or LiDAR. Still, methods that use RADAR or LiDAR are also contemplated for determination of cause of traffic events, either alone or in combination with a vision sensor, in accordance with certain aspects of the present disclosure.

As described herein, visual information may be further used to determine the pose and gaze of the driver. The word "pose" is used herein to refer to a sitting position, posture, and/or orientation that the driver has when driving a vehicle. The word "gaze" is used herein to refer to a direction where the driver is looking and/or facing.

The gaze of the driver may indicate that the driver is looking straight onto the road, or looking down at his mobile phone or looking at something on his right side. The pose of the driver may indicate that the driver is sitting in a slouched pose which may indicate drowsiness and inattentiveness. Sustained and/or periodic determinations of the pose and gaze may enable assessment and tracking and reporting of behavioral trends of the driver, which may inform coaching sessions, scheduling, job assignments, and the like. In some embodiments, a determined pose and/or gaze may inform whether to alert the driver and/or safety manager about an encountered unsafe driving scenario, as described in more detail below.

FIG. 1A illustrates an embodiment of the aforementioned system for determining and/or providing alerts to an operator of a vehicle. The device 100 may include input sensors (which may include a forward-facing camera 102, a driver facing camera 104, connections to other cameras that are not physically mounted to the device, inertial sensors 106, car OBD-II port sensor data (which may be obtained through a Bluetooth connection 108), and the like) and compute capability 110. The compute capability may be a CPU or an integrated System-on-a-chip (SOC), which may include a CPU and other specialized compute cores, such as a graphics processor (GPU), gesture recognition processor, and the like. In some embodiments, a system for determining, transmitting, and/or providing alerts to an operator of a vehicle and/or a device of a remote driver monitoring system may include wireless communication to cloud services, such as with Long Term Evolution (LTE) 116 or Bluetooth communication 108 to other devices nearby. For example, the cloud may provide real-time analytics assistance. In an embodiment involving cloud services, the cloud may facilitate aggregation and processing of data for offline analytics. The device may also include a global positioning system (GPS) either as a separate module 112, or integrated within a System-on-a-chip 110. The device may further include memory storage 114.

A system for determining, transmitting, and/or providing alerts to an operator of a vehicle and/or a device of a remote driver monitoring system, in accordance with certain aspects of the present disclosure, may assess the driver's behavior in real-time. For example, an in-car monitoring system, such as the device 100 illustrated in FIG. 1A that may be mounted to a car, may perform analysis in support of a driver behavior assessment in real-time, and may determine cause of traffic events as they occur. In this example, the system, in comparison with a system that does not include real-time processing, may avoid storing large amounts of sensor data since it may instead store a processed and reduced set of the data. Similarly, or in addition, the system may incur fewer costs associated with wirelessly transmitting data to a remote server. Such a system may also encounter fewer wireless coverage issues.

Figure 1B:
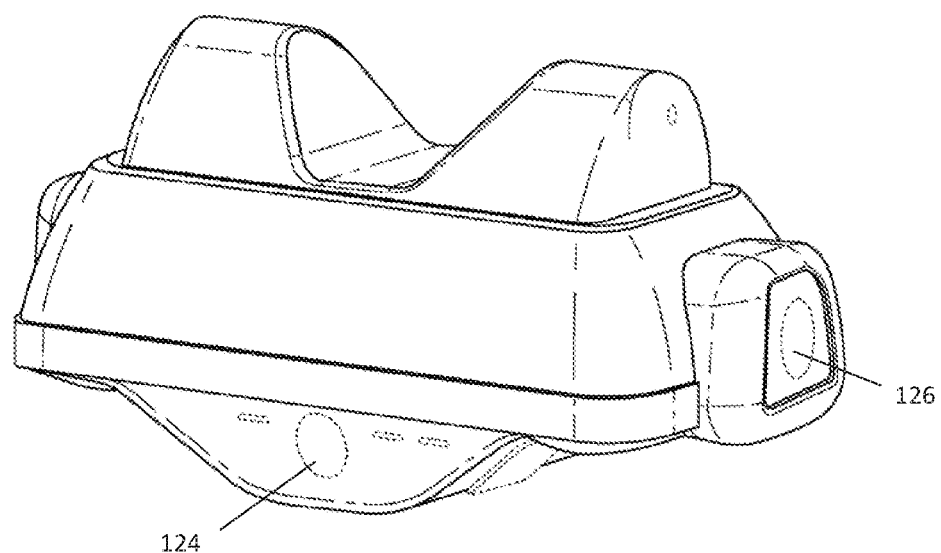
FIG. 1B illustrates a front-perspective view of an example camera device for capturing images of an operator of a vehicle and/or an outward scene of a vehicle in accordance with certain aspects of the present disclosure.
Figure 1C:
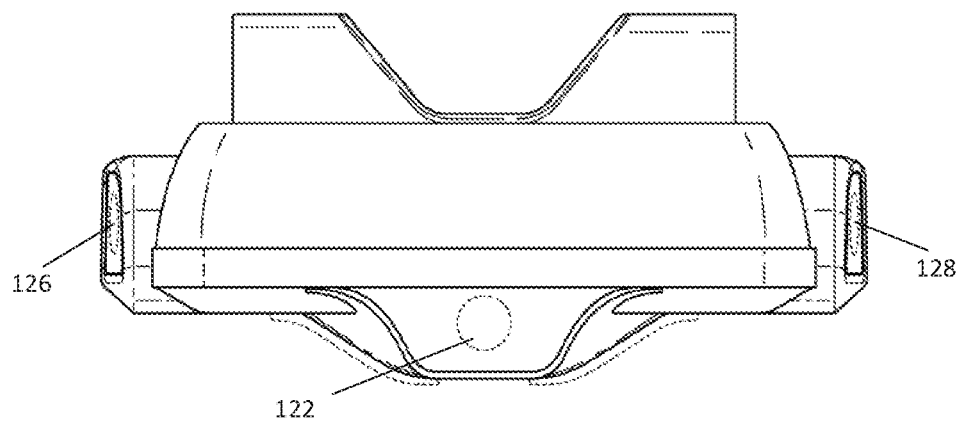
FIG. 1C illustrates a rear view of the example camera device of FIG. 1B in accordance with certain aspects of the present disclosure.

FIG. 1B illustrates an embodiment of a device with four cameras in accordance with the aforementioned devices, systems, and methods of distributed video search with edge computing. FIG. 1B illustrates a front-perspective view. FIGURE IC illustrates a rear view. The device illustrated in FIG. 1B and FIG. 1C may be affixed to a vehicle and may include a front-facing camera aperture 122 through which an image sensor may capture video data (e.g., frames or visual data) from the road ahead of a vehicle (e.g., an outward scene of the vehicle). The device may also include an inward-facing camera aperture 124 through which an image sensor may capture video data (e.g., frames or visual data) from the internal cab of a vehicle. The inward-facing camera may be used, for example, to monitor the operator/driver of a vehicle. The device may also include a right camera aperture 126 through which an image sensor may capture video data from the right side of a vehicle operator's Point of View (POV). The device may also include a left camera aperture 128 through which an image sensor may capture video data from the left side of a vehicle operator's POV. The right and left camera apertures 126 and 128 may capture visual data relevant to the outward scene of a vehicle (e,g., through side windows of the vehicle, images appearing in side rear-view mirrors, etc.) and/or may capture visual data relevant to the inward scene of a vehicle (e.g, a part of the driver/operator, other objects or passengers inside the cab of a vehicle, objects or passengers with which the driver/operator interacts, etc.).

Figure 2:
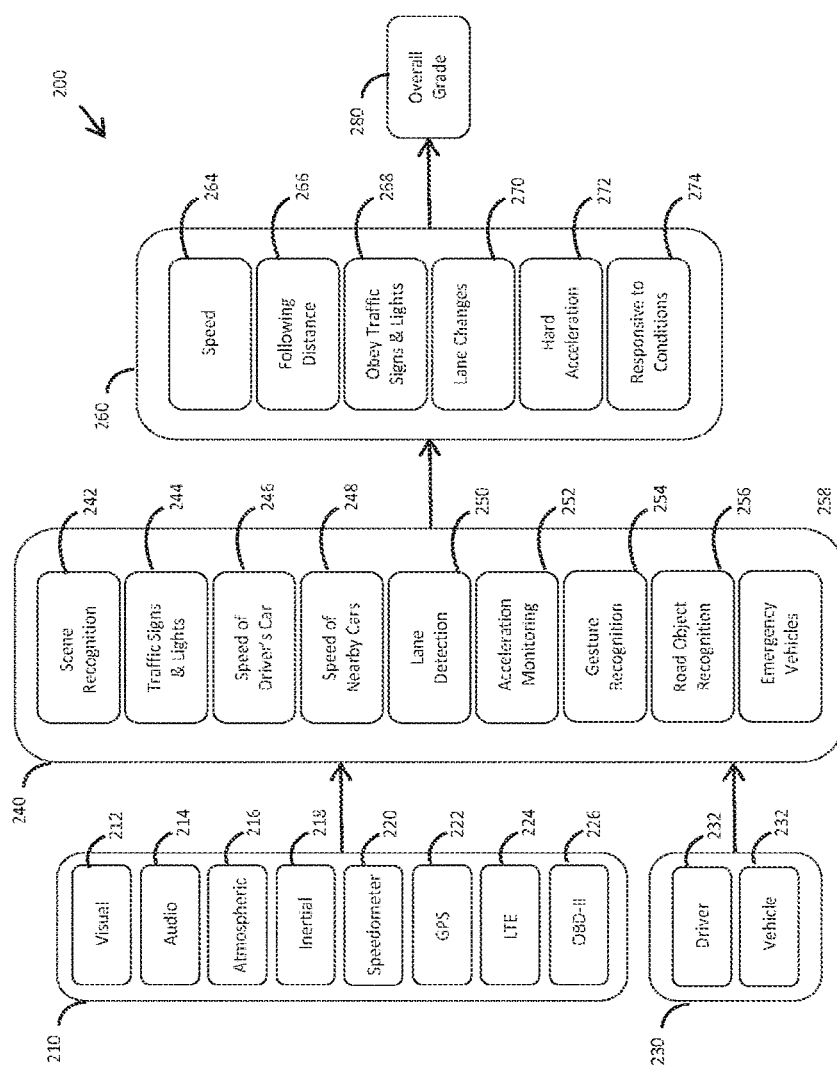
FIG. 2 illustrates a block diagram of an example system of vehicle, driver, and/or outward scene monitoring in accordance with certain aspects of the present disclosure.

A system for determining, transmitting, and/or providing alerts to an operator of a vehicle and/or a device of a remote driver monitoring system, in accordance with certain aspects of the present disclosure, may assess the driver's behavior in several contexts and perhaps using several metrics. FIG. 2 illustrates a system of driver monitoring, which may include a system for determining and/or providing alerts to an operator of a vehicle, in accordance with aspects of the present disclosure. The system may include sensors 210, profiles 230, sensory recognition and monitoring modules 240, assessment modules 260, and may produce an overall grade 280. Contemplated driver assessment modules include speed assessment 262, safe following distance 264, obeying traffic signs and lights 266, safe lane changes and lane position 268, hard accelerations including turns 270, responding to traffic officers, responding to road conditions 272, and responding to emergency vehicles. Each of these exemplary features is described in PCT application PCT/US17/13062, entitled "DRIVER BEHAVIOR MONITORING", filed 11 Jan. 2017, which is incorporated herein by reference in its entirety. The present disclosure is not so limiting, however. Many other features of driving behavior may be monitored, assessed, and characterized in accordance with the present disclosure.

Activating In-Vehicle Alerts and/or Transmitting Remote Alerts

Figure 3A:
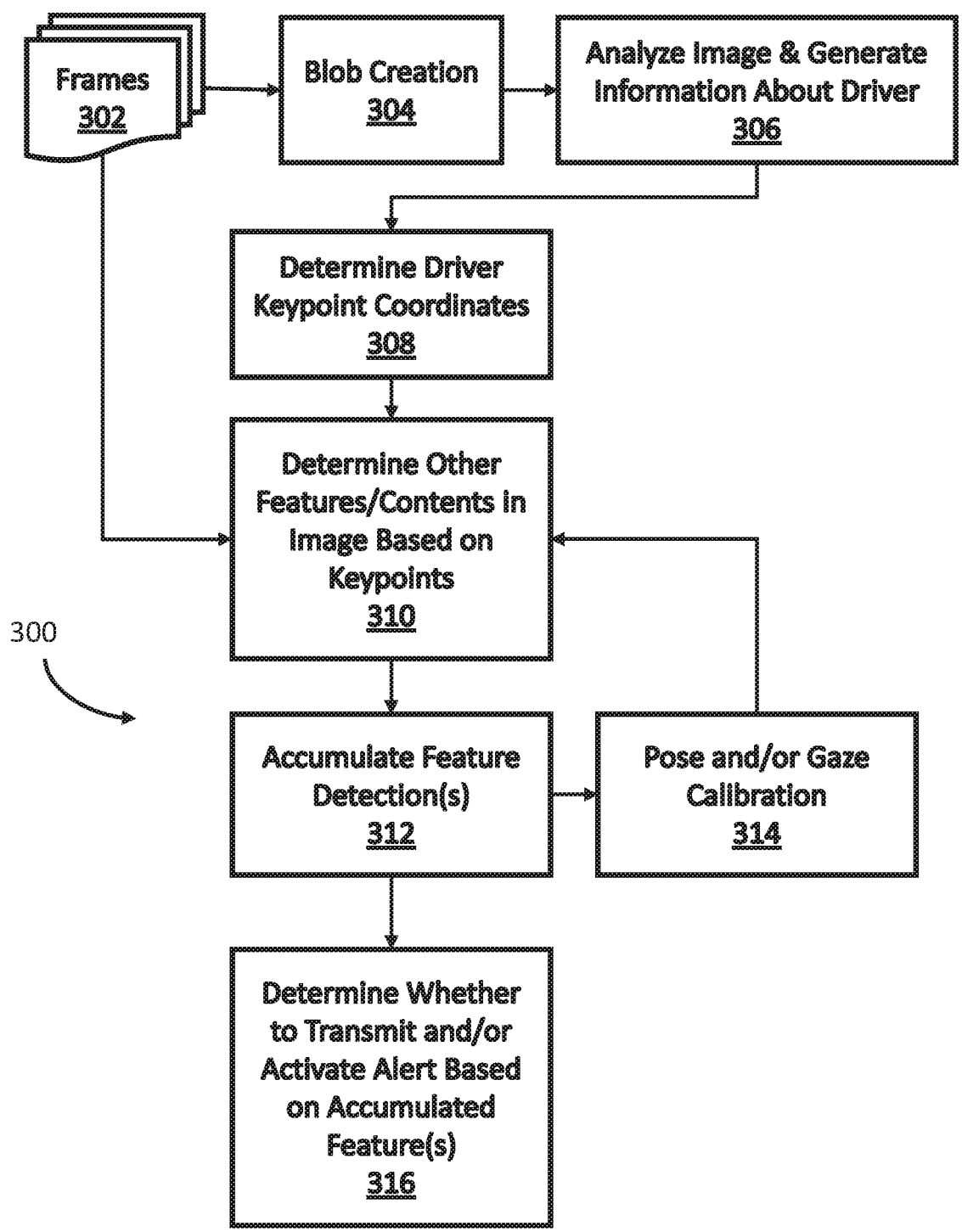
FIG. 3A illustrates a flow chart of an example method for determining keypoints of a driver of a vehicle and using the keypoints to determine whether to transmit and/or activate an alert in accordance with certain aspects of the present disclosure.

FIG. 3A illustrates a flow chart of an example method 300 for determining keypoints of a driver of a vehicle and using the keypoints to determine whether to transmit and/or activate an alert in accordance with certain aspects of the present disclosure. In other words, the method 300 relates to the inward scene of a vehicle, including the driver, where the driver is looking, what the drive is doing, etc. Frames 302 represent visual or image data captured by an inward facing camera (e.g., through the inward-facing camera aperture 124 of the device of FIG. 1B). At 304, a blob for further analysis is selected form the frames 302. For example, the image frames captured by a camera may include a wider view than just a driver, but only the driver is of interest for analyzing the driver's pose and/or gaze. Accordingly, the system may use a blob to reduce the processing for analyzing a driver.

At 306, the image blob and information about the image blob (e.g., how the original image was reshaped, resited, etc.) may be analyzed to generate information about the driver. For example, the system may generate a hounding box around a driver or portion of a driver in the blob. The system may also generate coordinates of the bounding box within the blob or the larger image before the blob was created. If there is more than one person present inside the vehicle, more than one bounding box (one for each person) may be generated. Keypoint masks may also be generated about drivers. The keypoint masks are fit to the person identified in the blob, and may be used to determine the relative coordinates of specific keypoints with respect to the person bounding box coordinates. In other words, the information generated about the driver may include keypoint masks that are used to determine driver keypoints at 308.

Various types of image recognition systems may be used to perform the steps of the method 300. For example, a deep neural network (DNN) may be used to determine whether there is a person in the blob, the person bounding box (and associated coordinates), the keypoint masks (and any associated coordinates), etc.

At 308, the keypoint masks and the driver bounding box (part of the information generated about the driver at 306) is used to determine individual keypoints of the driver. As described herein, keypoints may be used to determine pose and/or gaze of a driver. At 310, the various keypoints are used to determine other features/contents in the image. For example, the identified keypoints may indicate where a seatbelt is, where a part of the driver is (e.g., eyes, shoulders, nose, mouth, head, arms, hands, chest, etc.), etc. The keypoints themselves and/or the features/contents identified in the image/visual data may be used to determine pose, gaze, and or other aspects (e.g., is seatbelt on, is driver wearing sunglasses, is driver holding something, etc.), Bounding boxes with associated coordinates for each identified feature/content may also be generated by the system, such that those features/content of the image as identified may be monitored by the system.

In various embodiments, a model that recognizes and tracks features of a driver may also recognize objects within the vehicle, such as a smartphone, drink cup, food, phone charger, or other object. If an object is determined in the inward scene, the location information of that object may be used to determine whether the driver is distracted or not. For example, if a driver holds up their smartphone so that it is part of their field of view out the windshield, the system may see the driver as looking forward properly. However, the presence of the smartphone elevated into the field of view of the windshield may indicate distracted driving. Accordingly, if the system determines that the driver is looking ahead but the smartphone is elevated in field of view for a particular threshold of time and frames over that time, the system may determine that a driver is distracted or otherwise not looking at a potentially unsafe condition outside of the vehicle and trigger alerts accordingly. A smartphone may be determined, for example, by determining a wrist keypoint of the driver, cropping around the wrist and classifying the region around the wrist with a phone detection that looks for the shape and/or edges of a smartphone. Once the location of the phone is known, it may be used in conjunction with pose and gaze information to determine if the driver is looking at the phone.

Over time, the features/contents identified at 310 may be monitored, and different frames classified to determine what a driver is doing over time. In other words, at 312, the features/contents are accumulated over time and their characteristics are determined so that the system may understand what the driver is doing, looking at, feeling, etc. For example, a seatbelt bounding box may be classified as absent (not fastened on driver) or present (fastened on driver). If a seatbelt not present is accumulated over a predetermined threshold number of frames while the vehicle is being operated, for example, an alert may be activated in-vehicle and/or may be transmitted to a remote server. In other examples, a yawn may be detected by accumulating classifications of a mouth of open, closed, or not sure. If a mouth is classified as open over a certain number of image frames that coincides with a typical amount of time for a yawn, the driver may be considered to have yawned. Eyes may be monitored to detect blinks, long blinks or other eye closures that may indicate a driver falling asleep, glasses on with eyes open, glasses on with eyes closed (e.g., for detecting blinks or other eye closures), glasses on with eyes not visible, or not sure. If, for example, an eye closure is detected over a predetermined amount of time (e.g., corresponding to a particular number of frames), the system may determine that the driver is falling asleep.

The system may also detect pose and gaze to determine the posture of a driver and/or where the driver is looking. The pose and gaze information may also be accumulated to determine if a driver is distracted by something for longer than a threshold amount of time, to determine if a driver is looking at or has recently looked at something (e.g., is driver looking at a potentially unsafe driving condition such as approaching a red light without slowing down, has driver recently looked in mirror and/or shoulder checked adjacent lane before changing lanes, etc.). The predetermined thresholds of time for accumulating features may differ before any action is taken for various features. For example, if a blink lasts more than two or three seconds an alert may be activated in-vehicle and/or transmitted remotely. A yawn may be determined to have occurred where the mouth is open for, e.g., three seconds. In another example, an alert relating to a seatbelt may not be triggered until the system has determined that the driver has not been wearing a seatbelt for one minute. Accordingly, at 316, in-vehicle alerts may be activated and/or remote alerts may be transmitted based on accumulated features as described herein. In various embodiments, the predetermined thresholds for whether to activate an in-vehicle alert may be different than the accumulation thresholds for transmitting a remote alert. In some examples, the threshold for whether to activate an in-vehicle alert may be shorter, and the system may determine if the driver responds to the alert. If the driver does not respond to the in-vehicle alert, the system may transmit the remote alert after a second, longer threshold of time has accumulated with respect to a detected feature. As described herein, any of the information collected about the inward scene (e.g., of the driver) of a vehicle may be used in conjunction with information about the outward scene of the vehicle to determine when and if to activate and/or transmit alerts.

At 314, the system may use various accumulated features (e.g., shoulders, head, arms, eyes, etc.) to determine the pose and/or gaze of the driver in other words, the various keypoints, feature bounding boxes, etc. may be used to detect where the driver is looking and/or the posture of the driver over time. For example, the system may calibrate a normal pose and/or gaze of the driver as further described herein. That information may be used to feed back into 310 to determine a normal pose and/or gaze of the driver based on the various keypoints/bounding boxes being monitored. Then the system can accumulate various feature detections at 312 after the pose and/or gaze calibration is complete to determine deviations from a normal pose and/or gaze over time. In other words, the system may compute normalized distances, angles, etc. of a particular driver so that the system can determine when those measurements change to determine looking down, looking right, looking left, etc. Gaze and pose detection is further demonstrated described herein, including with respect to FIGS. 10-22.

In various embodiments, thresholds for a number or percentage of accumulated features detected over a particular time threshold may also be utilized. For example, if a driver has their eyes closed, the system may not be able to detect that the driver's eyes are closed for every single frame captured over the course of, e.g., three seconds. However, if the system detects eye closure in, e.g., 70% of frames captured over three seconds, the system may assume that the driver's eyes were closed for all three seconds and activate or transmit an alert. Detections may not be perfectly accurate where, for example, a frame is saturated due to sunlight, a frame is too dark, the driver has changed pose so significantly that the normal features/keypoints/bounding boxes may not be useful for accumulating feature detections, etc. Other thresholds may be used. For example, an alert may be transmitted or activated if a seatbelt is detected on the driver less in less than 30% of frames over the course of a minute. An alert may be transmitted or activated if a gaze of a driver is determined such that the driver is looking down in 95% or more of frames captured over the course of three seconds.

Other rules, thresholds, and logic may also be used at 316 to determine whether and/or when to activate and/or transmit an alarm. For example, aspects of the vehicle may be taken into account. For example, certain alarms may not be triggered if the vehicle is going less than a predetermined threshold of speed five miles per hour (mph)), even if an accumulated feature would otherwise indicate triggering an alarm. In another example, an alarm may be suppressed if, for example, a feature that relies on a certain orientation of the driver is not occurring. For example, if a driver is looking left to check an adjacent lane, the driver's eyes may not be visible to determine blinks. Accordingly, if the driver is not looking straight, the system may automatically not accumulate any eyes closed determinations for purposes of triggering alarms.

Figure 3B:
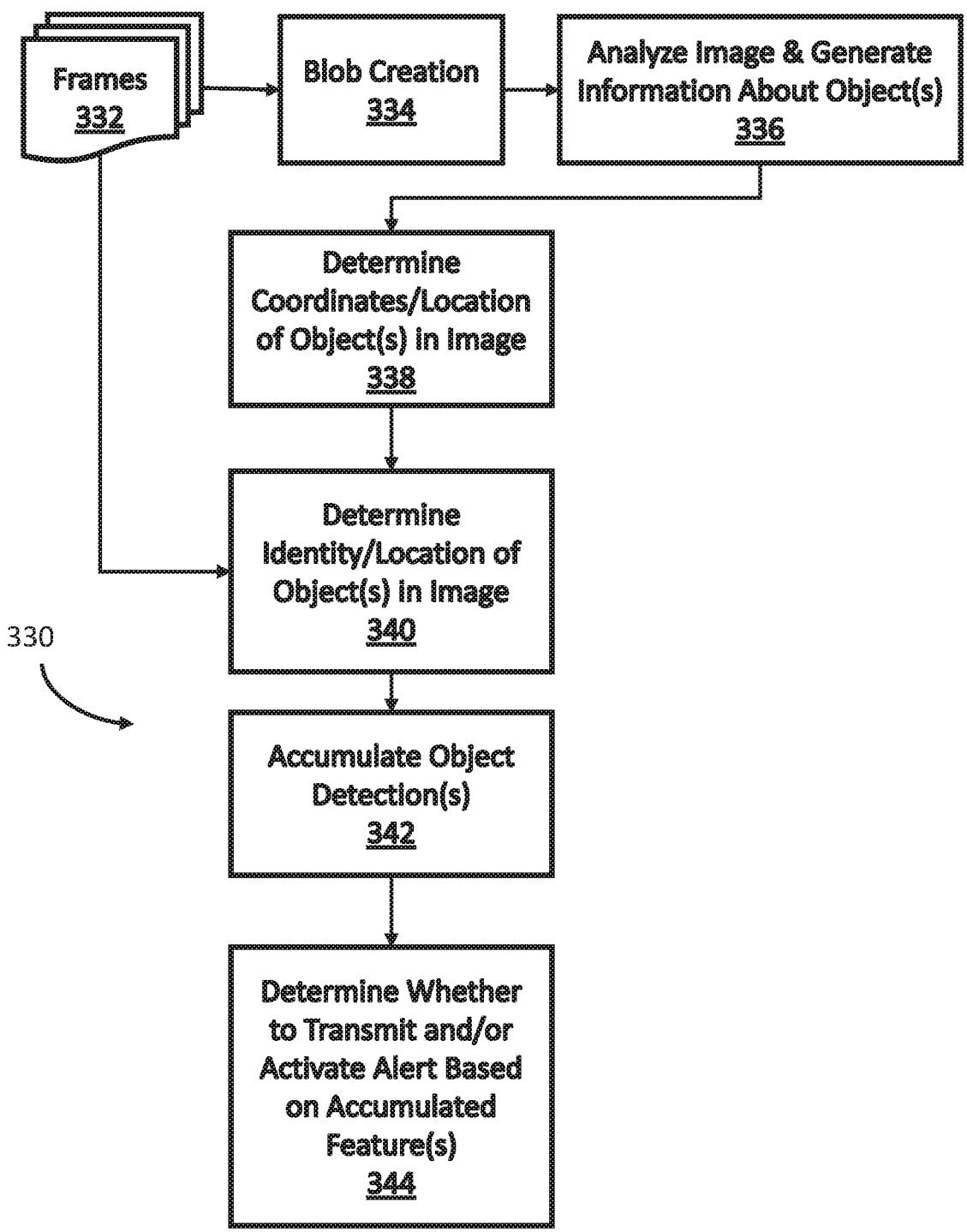
FIG. 3B illustrates a flow chart of an example method for determining objects in an outward scene of a vehicle and using the objects to determine whether to transmit and/or activate an alert in accordance with certain aspects of the present disclosure.

FIG. 3B illustrates a flow chart of an example method 330 for determining objects in an outward scene of a vehicle and using the objects to determine whether to transmit and/or activate an alert in accordance with certain aspects of the present disclosure. At 334 a blob is created using frames 332. In various embodiments, blob creation may not be performed where everything a camera captures outward of the vehicle is potentially relevant. In other embodiments, the camera may capture some things that are not relevant to an outward scene, such as part of the vehicle in which the camera is mounted.

At 336, captured image frames are analyzed and information about objects in the image is generated. At 338, the coordinates/locations of objects in the images may be determined. The coordinates/locations of objects in the images may be determined, for example, by applying masks to the image to find other vehicles, traffic control devices, lanes, curbs, etc. Bounding boxes may be generated for those objects, and further processing of the image may be performed at 340 to determine the identity and location of objects in the images. For example, the types of signs detected may be determined, the location and identity of vehicles may be determined, etc. At 342, the detected objects are accumulated over time. For example, other vehicles may be monitored over time to determine, e.g., how close the other vehicle is to the vehicle with the camera. Information accumulated about objects detected in the outward scene may be used to determine whether to transmit remote alerts and/or activate in-vehicle alerts at 344 as described herein. For example, if the vehicle with the camera is rapidly approaching a stopped vehicle in the road, the system may determine that an in-vehicle alert may be activated. The method 330 may also be used in conjunction with the method 300 with a set of rules and logic such that alerts use both inward and outward scene information. For example, an in-vehicle alert may be activated sooner if the driver's gaze indicates that the driver is not looking toward the potentially unsafe driving condition (e.g., the stopped vehicle in the road), or has not looked toward the potentially unsafe driving condition within a threshold of time.

Figure 3C:
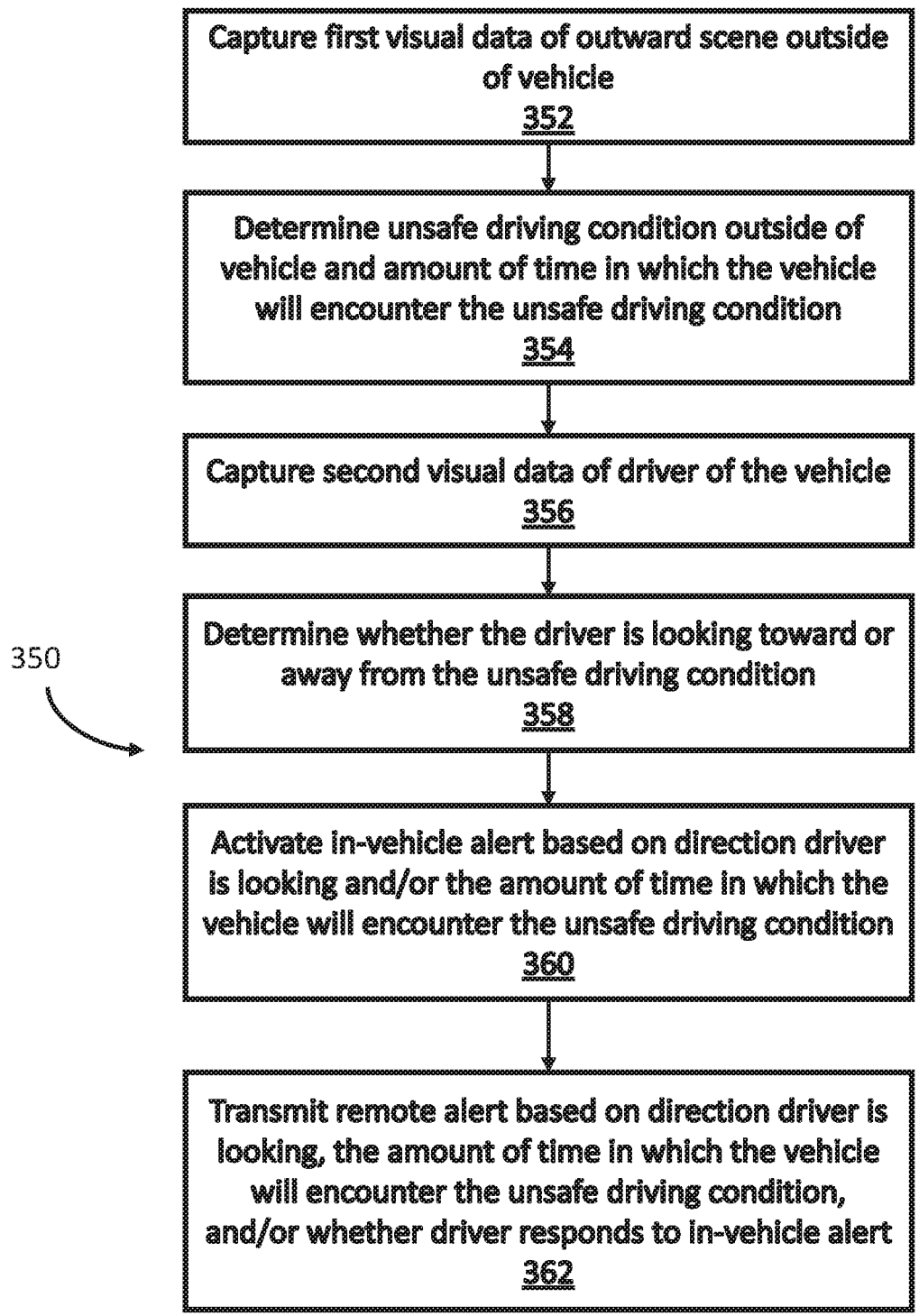
FIG. 3C illustrates a flow chart of an example method for using visual data captured of both the inward scene of a driver and an outward scene of a vehicle to determine whether to transmit and/or activate an alert in accordance with certain aspects of the present disclosure.

FIG. 3C illustrates a flow chart of an example method 350 for using visual data captured of both the inward scene of a driver and an outward scene of a vehicle to determine whether to transmit and/or activate an alert in accordance with certain aspects of the present disclosure. At 352, first visual data of an outward scene outside of a vehicle is captured with an outward facing camera. At 354, a potentially unsafe driving condition outside of the vehicle and an amount of time in which the vehicle will encounter the potentially unsafe driving condition is determined based on the first visual data. At 356, second visual data of a driver of the vehicle is captured with a driver facing camera. At 358, the system determines, based on the second visual data, whether a direction in which the driver is looking is toward to the potentially unsafe driving condition or away from the potentially unsafe driving condition. At 360, an in-vehicle alert is activated based on the direction the driver is looking and/or the amount of time in which the vehicle will encounter the potentially unsafe driving condition. At 362, a remote alert is transmitted, to a remote server, based on the direction the driver is looking, the amount of time in which the vehicle will encounter the potentially unsafe driving condition, and/or whether the driver responds to the in-vehicle alert. As described herein throughout, various combinations of in-vehicle and remote alerts may be activated/transmitted in different situations, including the severity of the incident, whether the driver responded timely to an in-vehicle alert, the type of potentially unsafe driving condition that occurred, etc. In various embodiments, an in-vehicle alert may not be activated and a remote alert may still be transmitted. In various embodiments, an in-vehicle alert may be activated while a remote alert is not transmitted.

For example, a remote alert and/or the in-vehicle alert may be triggered when the driver is determined to be looking away from the potentially unsafe driving condition and in response to determining that the amount of time in which the vehicle will encounter the potentially unsafe driving condition is at or below a first threshold of time. The remote alert and/or the in-vehicle alert may also be triggered when the driver is determined to be looking toward the potentially unsafe driving condition. The remote alert is transmitted in response to determining that the amount of time in which the vehicle will encounter the potentially unsafe driving condition is at or below a second threshold of time. The first threshold of time in this example may be greater than the second threshold of time, such that an alert is triggered more quickly if the driver is not looking toward the potentially unsafe condition.

In another example, the in-vehicle alert may be activated before the remote alert is transmitted (e.g., the predetermined thresholds of time associated with the in-vehicle alert and the remote alert are different). In this way, the driver may have a chance to respond to the alert and remedy the potentially unsafe driving condition before the remote alert is transmitted. In other words, the remote alert may be sent in response to a determination that the driver does not look toward the potentially unsafe driving condition after the in-vehicle alert is activated and/or that the driver does not prevent the vehicle from reaching a point where the amount of time in which the vehicle will encounter the potentially unsafe driving condition is at or below a predetermined threshold of time. Accordingly, four different amount of time thresholds may be used: 1) in-vehicle alert for when driver is looking at potentially unsafe condition, 2) in-vehicle alert for when driver is not looking at the potentially unsafe condition, 3) remote alert transmission for when driver is looking at potentially unsafe condition, and 4) remote alert transmission for when the driver is not looking at the potentially unsafe condition.

The remote alert transmission may include various types of information, data, the images or video associated with the alert (from inside the vehicle and/or the outward scene), etc. The information in the remote alert may also include information about the determined pose and gaze of the driver at and before the remote alert transmission is made, including any accumulated pose/gaze: information, rules triggered, exceptions, etc. The amount of time in which a vehicle with a camera will encounter the potentially unsafe driving condition is determined based on at least one of a speed of the vehicle, a distance from the vehicle to an object associated with the potentially unsafe driving condition, and/or a speed of the object associated with the potentially unsafe driving condition. The object associated with a potentially unsafe driving condition may include any of a traffic light, a stop sign, an intersection, a railroad crossing, a lane or road boundary, a second vehicle, lane or road boundary, or any other object, obstruction, etc.

In various embodiments, when a remote alert is transmitted, a remote device or party may be able to request and/or otherwise activate a live video feed from one or more of the cameras in the vehicle. For example, if a driver is falling asleep as determined by the systems and methods described herein, the monitoring device in the vehicle may send a remote alert to remote server. A fleet manager, for example, may receive the remote alert, watch recorded video associated with the alert. The remote alert may include an option, presented to the fleet manager through a graphical user interface (GUI), to request a live video feed from the in-vehicle monitoring device. Accordingly, a request to stream live video captured by at least one of an outward facing camera or a driver facing camera is sent to the in-vehicle device, and the in-vehicle device may begin transmitting the live video in response to the request back to a device of the fleet manager. Each of the inward and outward camera videos may be streamed, or the fleet manager may select, through the GUI, which camera feed to stream.

FIGS. 4-9 demonstrate various examples of outward and inward scenes of a vehicle that may be monitored. The outward scenes may include potentially unsafe driving conditions as described herein, and the inward scenes may include various driver behavior that may be determined using pose and/or gaze determinations as described herein. In addition, the determinations made about the inward and outward scenes of a vehicle may be used in combination to determine when and whether to activate in-vehicle alarms and/or transmit remote alarms as described herein.

Figure 4A:
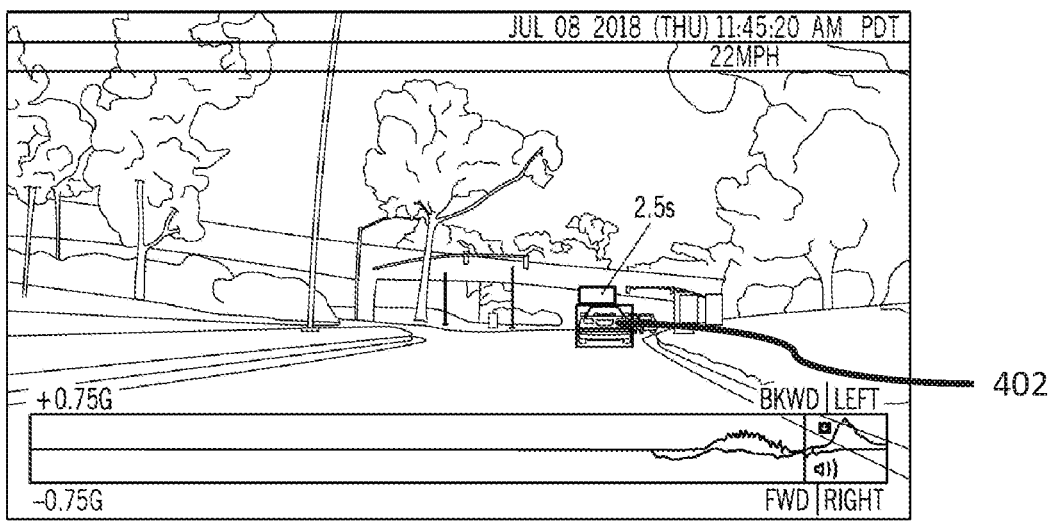
FIGS. 4A and 4B illustrate an example of when a forward crash warning (FCW) may be transmitted and/or activated in accordance with certain aspects of the present disclosure.
Figure 4B:
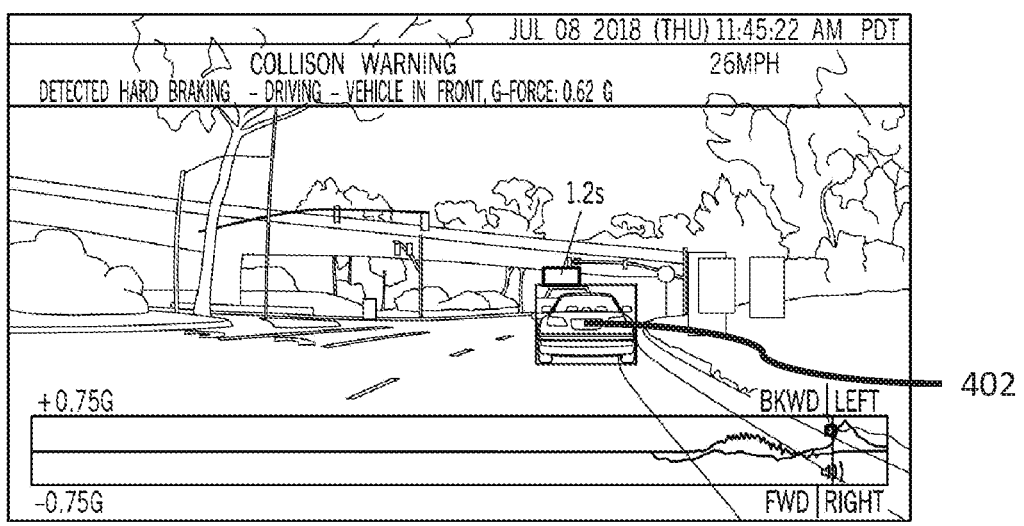

FIGS. 4A and 4B illustrate an example of when a forward crash warning (FCW) may be transmitted and/or activated in accordance with certain aspects of the present disclosure. In FIG. 4A, a vehicle 402 is in the outward scene in front of the vehicle with the camera. The distance between the two vehicles and the speed at which the vehicles are traveling may be used to determine the amount of time in which the vehicle with the camera will encounter the vehicle 402, a potentially unsafe driving condition. If the amount of time dips below a particular threshold, for example as the vehicle 402 gets closer in FIG. 4B, an alert may be triggered. For example, the threshold may be two seconds.

Figure 5:
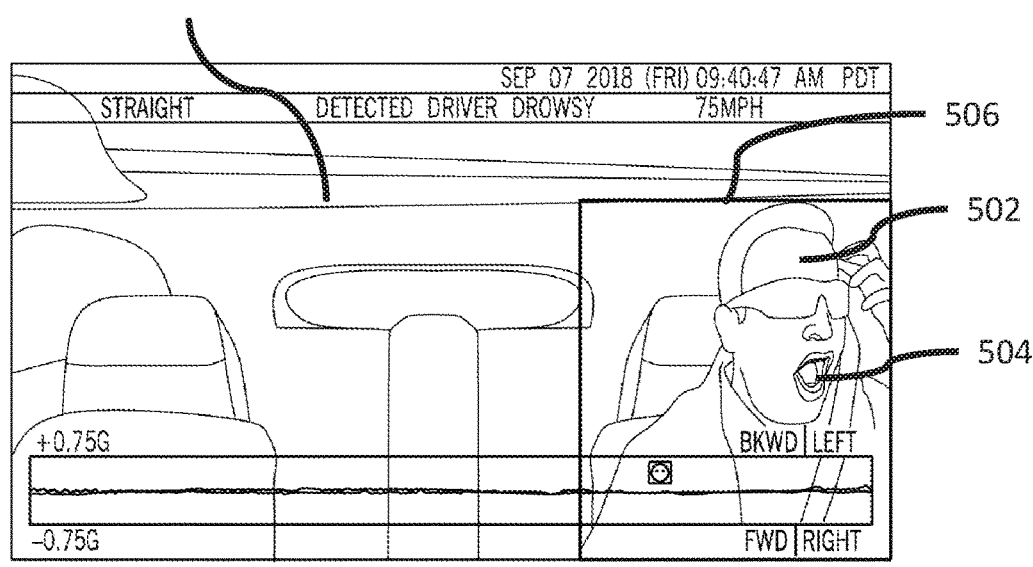
FIG. 5 illustrates an example of when a warning for tired driving as a result of yawning may be transmitted and/or activated in accordance with certain aspects of the present disclosure.

FIG. 5 illustrates an example of when a warning for tired driving as a result of yawning may be transmitted and/or activated in accordance with certain aspects of the present disclosure. FIG. 5 shows a driver 502 with a mouth 504 that is open, which may indicate yawning as described herein. FIG. 5 also shows a bounding box 506 for the driver, and a blurred area 508. The bounding box 506 may represent a blob that is determined to have the driver in it, so that the blurred area 508 need not be analyzed. The bounding box 506 may also be used to determine various keypoints, such as the top of the driver 502's head, the driver 502's shoulders, etc.

Figure 6:
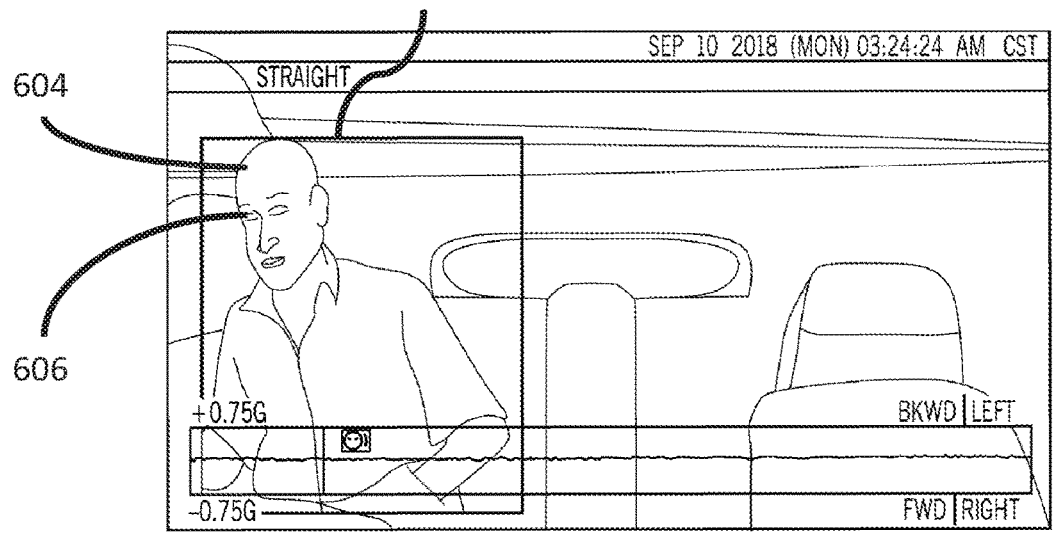
FIG. 6 illustrates an example of when a warning for tired driving as a result of an irregular blinking pattern may be transmitted and/or activated in accordance with certain aspects of the present disclosure.

FIG. 6 illustrates an example of when a warning for tired driving as a result of an irregular blinking pattern may be transmitted and/or activated in accordance with certain aspects of the present disclosure. FIG. 6 shows a driver 604 in a bounding box 602, and eyes 606 that are closed. As described herein, eyes closed determinations may be accumulated to determine an irregular blinking pattern or eyes closed for a long period of time or there is abnormally fast blinking that could indicate sleeping and/or tiredness in the driver 604.

Figure 7A:
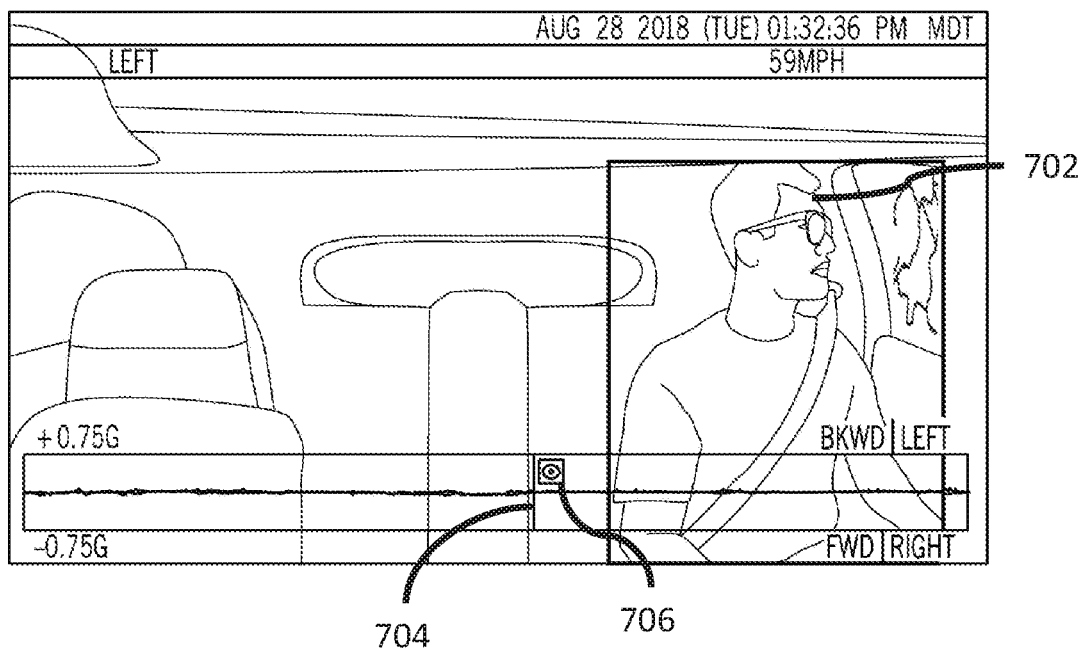
FIGS. 7A and 7B illustrate an example of when a warning for distracted driving may be transmitted and/or activated in accordance with certain aspects of the present disclosure.
Figure 7B:
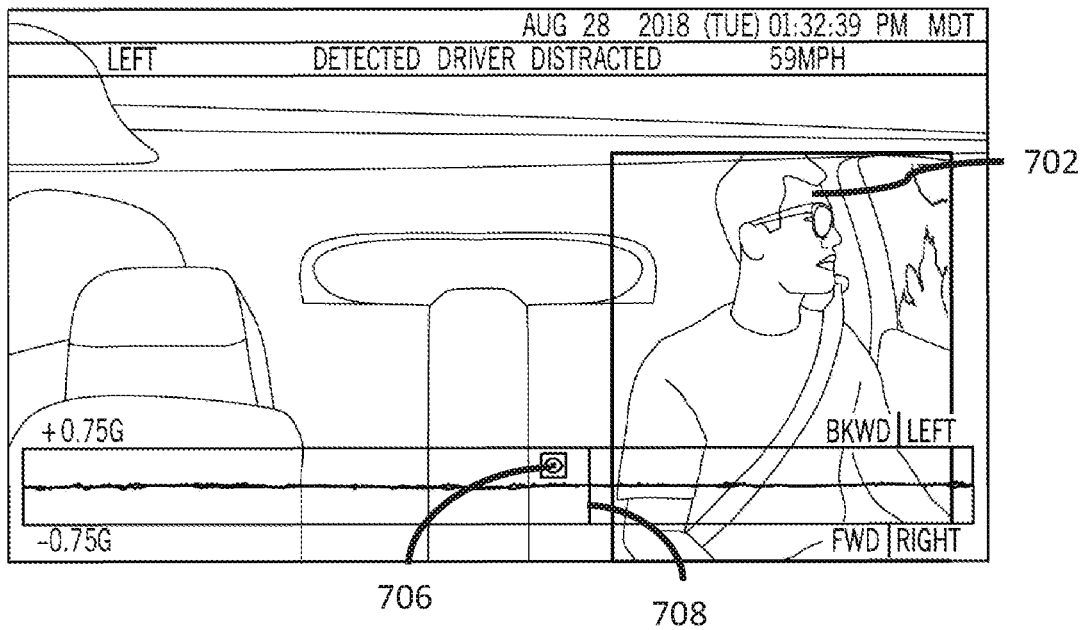

FIGS. 7A and 7B illustrate an example of when a warning for distracted driving may be transmitted and/or activated in accordance with certain aspects of the present disclosure. In FIG. 7A, a driver 702 looks to his left out the window at a first time 704. The looking away may be marked by a symbol 706 in the timeline. Then, at a second time 708 after the first time 704, the driver 702 is still looking to his left out the window (compare how the second time 708 has elapsed from the symbol 706 position). As described herein, the looking left of the driver 702 may be accumulated to determine if the driver is distracted. In other embodiments, if the driver 702 looked back forward at the second time 708, no alert may be triggered. In various embodiments, determinations of looking left or right may be used to suppress an alert instead of trigger an alert. For example, if a driver turns on their blinker and/or begins to change lanes, an alert may be triggered if the driver has not looked toward the lane in which they are changing into within a predetermined threshold of time within activating the blinker and/or beginning to move into the other lane. In contrast, if the driver has looked into the other lane and/or a mirror associated with the other lane within a predetermined amount of time, the user will be determined to not be distracted and no alarm may be triggered.

Figure 8A:
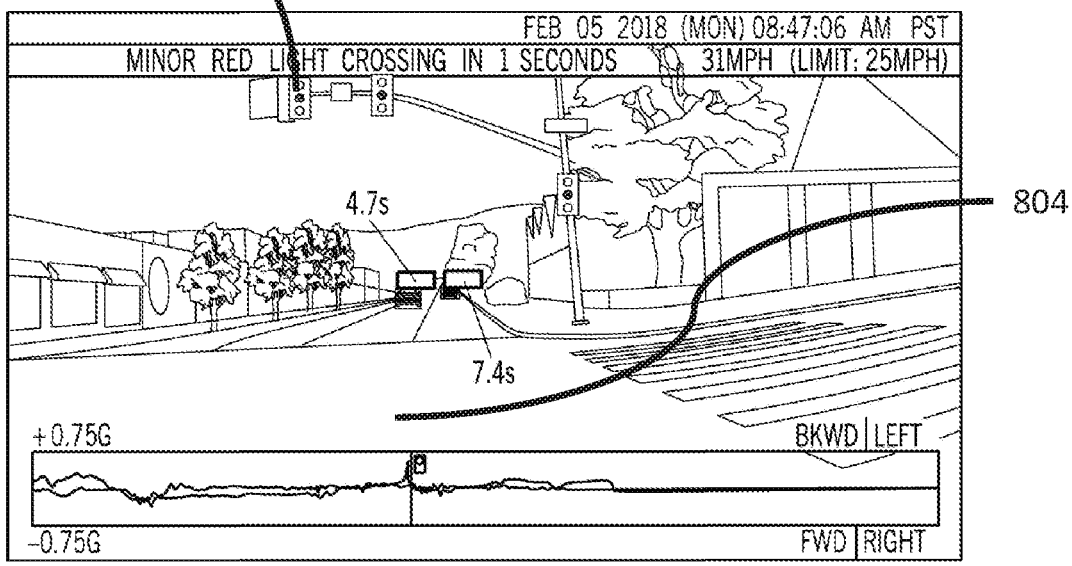
FIGS. 8A and 8B illustrate examples of when a warning for running a red and/or yellow light may be transmitted and/or activated in accordance with certain aspects of the present disclosure.
Figure 8B:
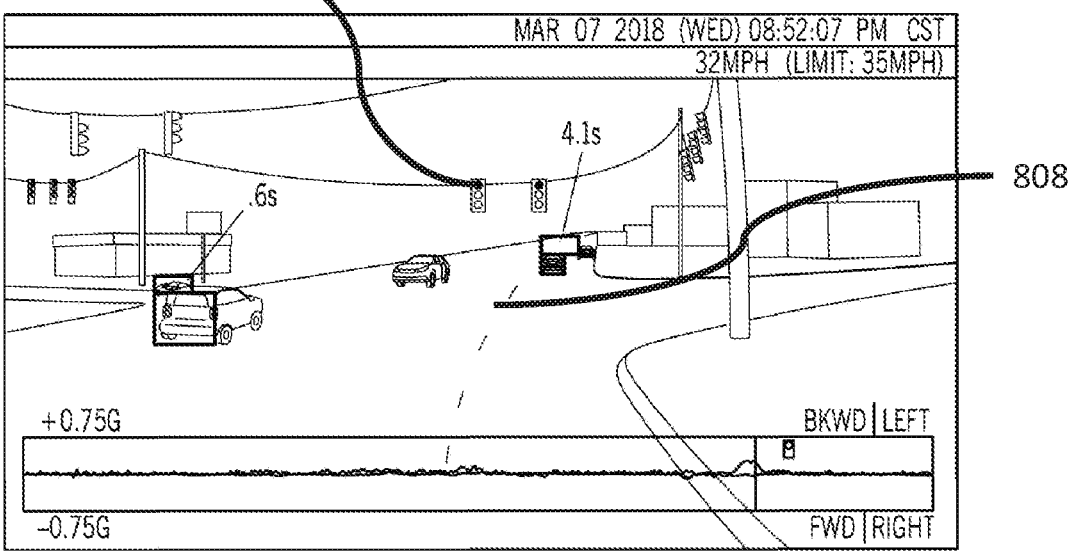

FIGS. 8A and 8B illustrate examples of when a warning for running a red and/or yellow light may be transmitted and/or activated in accordance with certain aspects of the present disclosure. FIG. 8A demonstrates a vehicle in an intersection 804 when a traffic light 802 turns or is yellow. In such an embodiment, an alert may be triggered after the potentially unsafe condition is determined. For example, a warning not to enter intersections when a traffic light is yellow may be activated in-vehicle for the driver, Such a situation may be considered a minor violation because no red light was run. In various embodiments, the classification of an event as minor or major may cause different alerts. For example, a minor event (running yellow light) may not trigger a remote alert. In other examples, a remote alert may be triggered if there are a threshold number of minor events over a particular amount of time that indicates a driver taking too many risks. In some embodiments, the system may not be able to activate an in-vehicle alert an adequate amount of time before the potentially unsafe driving condition occurs for the driver to avoid (e.g., running a yellow light). In such embodiments, alerts may merely be sent to warn the driver for the future or remotely monitor driving. In FIG. 8B, an example of a major traffic violation is shown, where the traffic light 806 is red before the vehicle enters an intersection 808. Because, the traffic light 806 is already red, an in-vehicle alert may be activated in time to warn the driver (e.g., if the driver is not looking toward the traffic light) so that the vehicle might be stopped before entering the intersection 808.

Figure 9A:
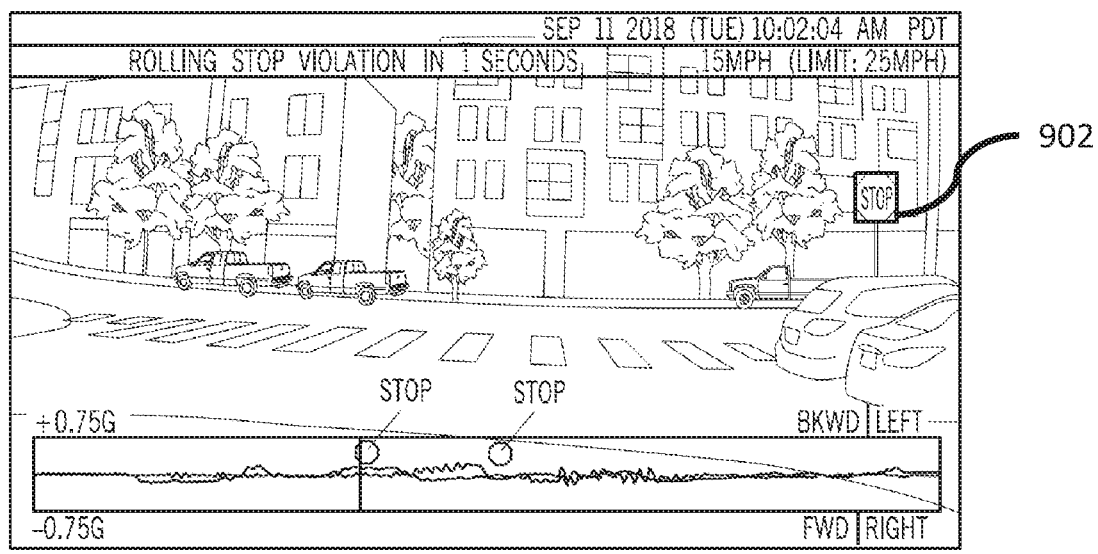
FIGS. 9A-9C illustrate examples of when a warning for failing to stop at a stop sign may be transmitted and/or activated in accordance with certain aspects of the present disclosure.
Figure 9B:
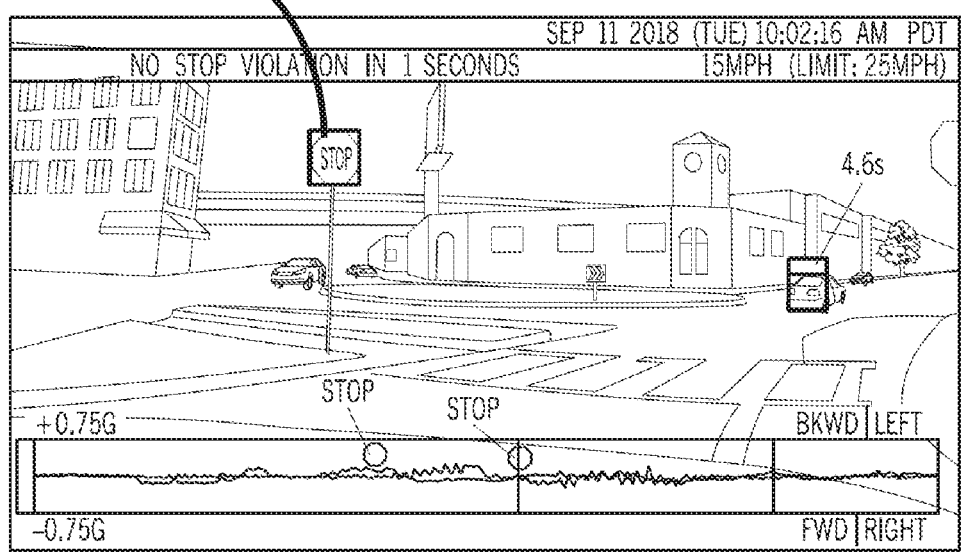
Figure 9C:
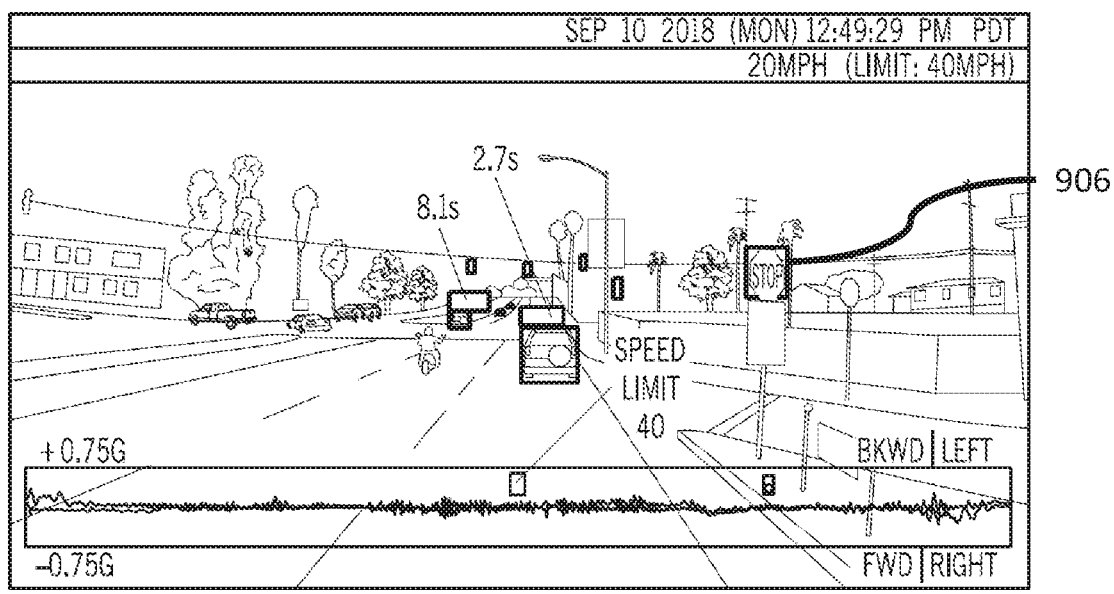

FIGS. 9A-9C illustrate examples of when a warning for failing to stop at a stop sign may be transmitted and/or activated in accordance with certain aspects of the present disclosure, Stop sign violations may also be categorized as major or minor, depending on the speed, context (e.g., are other vehicles/pedestrians present?), etc. For example, if a vehicle slows down under five mph that may be characterized as a minor rolling stop violation. If a vehicle completely stops or gets under some other speed threshold (e.g., 2 mph), the driver may be determined to have completely stopped. The system may determine that a potentially unsafe driving condition about which to trigger an alert is a stop sign where the driver is looking away and/or a stop sign where the system determines that the vehicle is not slowing down at a rate that will lead to at least a rolling stop or a complete stop, FIG. 9A demonstrates a vehicle that may be one second from a rolling stop violation because the vehicle is close to the stop sign 902, is travelling 15 mph, and is slowing down. FIG. 9B demonstrates a vehicle that may be one second from a full, major no stop violation because the vehicle is close to the stop sign 904, is travelling 15 mph, and is either speeding up or maintaining a constant speed. This information may be used along with the inward scene of a vehicle and the pose/gaze of a driver to determine when and whether to trigger alerts as described herein. FIG. 9C shows a stop sign 906 that is determined not to be applicable to the vehicle with the camera. Any of the bounding box, shape of the edges, location within the image, etc. may be used to determine that the stop sign 906 does not apply to the vehicle, therefore any alerts associated with the stop sign 906 may be suppressed or otherwise not triggered.

Gaze and Pose Detection

In an embodiment of certain aspects of the present disclosure, machine learning (ML) algorithms that may include neural networks, such as Convolutional Neural Networks, may be used to detect keypoints related to a driver of a vehicle. Detected keypoints may correspond to locations in visual data corresponding to one or more of the following: a left ear of the driver, a right ear of the driver, a left eye of the driver, a right eye of the driver, a nose of the driver, a left shoulder of the driver, a right shoulder of the driver. Other keypoints are also contemplated.

Convolutional Neural Networks (CNNs) are a class of Neural Network (NN) that may be applied to visual imagery. Because convolutional kernels usually applied to different locations of an input image, a given convolutional kernel may learn to detect one or more salient visual features at substantially any location in the image. By convolving a kernel with input data in a degree of translational invariance in keypoint detection may be achieved. Alternatively or in addition, other Neural Network architectures may be employed. In one example, a Fully-Connected or Locally-Connected Neural Network may be employed. In some embodiments, a Neural Network may comprise one or more layers having a convolutional kernel and one or more layers having a fully-connected layer. Unlike a convolutional layer of a neural network, a Fully-Connected or Locally-Connected neural network layer may be expected to process different portions of the input image with different kernels in different locations. Likewise, a Fully-Connected or Locally-Connected neural network layer may be expected to process different feature map inputs from upstream layers in a manner that varies across the feature map.

In some embodiments, such as in an embodiment directed to an after-market product, there may be a need achieve a high degree of translational invariance, as this may then support a wider range of mounting positions, camera lens properties, and the like. Accordingly, it may be desirable to detect keypoints of a driver wherever the driver may appear in visual data. Because there may be a high expected variance across installations of such an after-market product, convolutional kernels may be effectively employed to achieve a desired translational invariance.

A set of images with labeled keypoints may be referred to as training data. The training data may be provided as input to an ML algorithm, such as an ML algorithm configured to train a neural network to process visual data. In one example, the labeled keypoints may be represented by a one-hot encoding in which the target pixel location is represented with a number corresponding to the category of the keypoint and all other pixel locations are represented as zeros. In another embodiment, the pixel location of the labeled keypoints may be represented without regard to the category of the keypoint and the category of the keypoint may be determined separately. After processing image data, loss gradients may be applied to weights in the neural network that would have reduced the error on the processed data. Over repeated iterations, these techniques may train the neural network to detect features around the labelled keypoints that are important for detecting these keypoints.

Once the system learns from a set of training data (a set of images with labelled keypoints), the system may be tested to ensure that it is able to detect the keypoints from a different set of images. This different set of images may also have labeled keypoints available and the set of images and labeled keypoints may be referred to as test data. The errors from test data may be used to determine when training should stop. The testing data may be considered distinct from the training data, however, because the errors calculated on the test data may not be applied to update neural network weights directly. By maintaining this distinction, the performance of the neural network outputs may be more likely to generalize to images that are not present in the training or testing data, because the test data may be considered a proxy for data that the neural network may encounter after it is deployed. These two steps of training and testing may be repeated with random subsets of the training data until the accuracy of the neural network on the test data reaches a desired level of accuracy.

Certain aspects of the present disclosure provide a method to normalize the distance between detected keypoints. In one embodiment of certain aspects of the present disclosure, the distance between the left eye of the driver and the right eye of the driver, may be normalized by the distance between the left shoulder of the driver and the right shoulder. As illustrated in detail below, the shoulder distance of the driver may be an average or median distance between a first keypoint corresponding to the left shoulder of the driver and a second keypoint corresponding to the right shoulder of the driver. As explained below, the median value of this distance may correspond to the distance between the driver's shoulders when the driver is seated in a normal driving position (a typical driving pose).

In this first example, the determined keypoints that may be used to calculate the median shoulder distance may be continuously or periodically calculated from captured images of the driver. The median value of the shoulder distance may be calculated from all of the collected shoulder distance values over a pre-configured time interval. In one embodiment, the pre-configured time interval may be 2 minutes. By calculating the median of the shoulder distance determinations, the system may converge on a shoulder distance that corresponds to the driver in a typical driving posture.

According to certain aspects of the present disclosure, the median shoulder distance thus calculated may then be applied to normalize one or more determined distances between other pairs of keypoints. For example, if the driver leans forward thus coming closer to the camera, the distance between the left eye and the right eye (eye distance), which is the distance between the keypoint of the left eye and the keypoint of the right eye will increase in the captured image because the driver's head will occupy more of the image frame. The shoulder distance will likewise increase in this captured image. Since the system has calculated the median shoulder distance that corresponds to a typical pose, it may now use that value to determine a scaling factor between the median shoulder distance and the shoulder distance determined in the current frame. This scaling factor, in turn, may be used to scale the eye distance observed in the same frame. Methods for detecting gaze changes that are based on these scaled keypoint distances as disclosed herein may then be more robust to temporary postural changes than are methods that do not include such a normalizing step. Likewise, normalizing a keypoint distance by another determined median keypoint distance, as disclosed herein, may improve robustness to variations in the relative positions of the camera and the driver.

Accordingly, certain aspects of the present disclosure are directed to enabling the use of visual data of the driver facing camera in the vehicle to accurately detect the gaze of the driver as well as changes of the driver's gaze. While there are existing systems for determining the gaze of a driver, these systems may only work acceptably well for a camera located in a known position and for a driver who is seated within a relatively narrow range of distances from the camera. That is, without the benefit of certain aspects of the present disclosure, a determined gaze direction of two people, each situated in a different automobile and who are looking in the same direction outside of their respective automobile, may differ if those two people are of different heights or drivers may adjust their seats differently. In contrast, a system that is enabled with the present teachings may learn a median keypoint distance, such as a shoulder distance, of each driver. The system may then use the median keypoint distance normalize other keypoint distances, and therefore overcome this shortcoming of currently available gaze detection systems.

A median shoulder keypoint distance of a driver may be saved in an in-vehicle monitoring device or on a storage device in the cloud. This data may be retrieved by the monitoring device the next time the same driver is driving this vehicle. The retrieved shoulder keypoint distance may be used to normalize other keypoint distances immediately. In this way, the system may avoid a calibration period, such as the preconfigured amount of time described above, during which it is expected to find the median shoulder distance. In some embodiments, the median shoulder keypoint distance may be updated periodically, such as daily or weekly.

In one embodiment, the driver facing camera continuously captures images of the driver and transmits a subset of the images for processing on the onboard compute device. The visual data from the driver facing camera sensor is the image of the driver that is continuously received at the camera. This may be a preconfigured number of times, say 5 frames per sec (fps). This image data may be processed at the connected compute device next to the camera in the vehicle. The compute device may in addition send this data to another compute server in the cloud, which may have a more powerful graphics processor (GPU), digital signal processor (DSP), or other hardware accelerator.

Pose and gaze detection may be based on a sequence of object detections from more than one video frame (image). In some embodiments, the object detections across multiple frames may be used to infer the changes of pose and gaze of the driver and gain confidence in the detection by the compute device in the vehicle.

Figure 10:
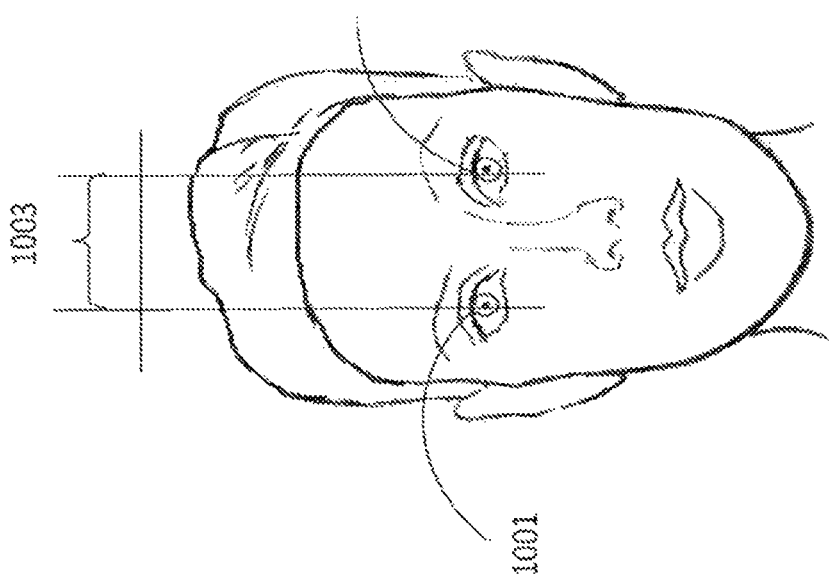
FIG. 10 illustrates example determined keypoints associated with the eyes of a driver in accordance with certain aspects of the present disclosure.

FIG. 10 illustrates an embodiment of the aforementioned devices, systems and methods for determining alerts based on visual data from driver-facing and outward-facing visual data. In this illustration, the driver's head may be visible in the image data captured by the driver-facing camera. The system may detect a first keypoint 1001 corresponding to the right eye of the driver and a second keypoint 1002 corresponding to the left eye of the driver. From the images captured by the driver-facing camera, the compute device may determine an 'eye distance' 1003 of the driver. As described above with respect to a median shoulder distance, a median 'eye distance' may be determined by sampling multiple images in a preconfigured time interval. In one embodiment, if the camera is capturing at 5 frames per second (FPS), and the pre-configured time is 2 minutes, then, the camera would capture 5*60 (sec)*2 (min)=600 images, in some embodiments, the camera may capture frames at a higher frame rate, but may send a subset of the captured frames to the compute device for processing. For example, if every sixth frame is processed from a camera that captures 30 FPS, the effective processing rate may be 5 FPS. From each of these processed images, a set of keypoints, with a first keypoint 1001 corresponding to the right eye and a second keypoint 1002 corresponding to the left eye, may be detected. The eye distance 1003 may be calculated for each frame in which both the right eye keypoint 1001 and the left eye keypoint 1002 are detected.

While the above examples describe using keypoints associated with the shoulders and/or the eyes, other embodiments are also contemplated. A pair of keypoints that may be used to determine a median keypoint distance may be associated with a variety of points on the face of the driver or on the body of the driver.

Figure 11:
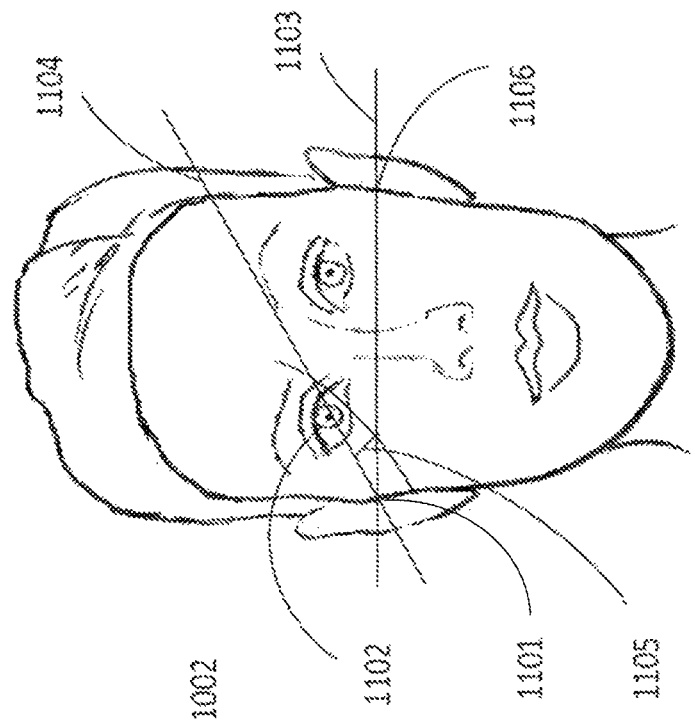
FIG. 11 illustrates example determined keypoints associated with an eye and an ear of a driver in accordance with certain aspects of the present disclosure.

In another embodiment and referring to FIG. 11, a system in accordance with certain aspects of the present disclosure may be configured to determine a median 'ear to eye' angle. Depending on which ear of the driver is detectable in more image frames, which would depend on the side of the vehicle on which the driver drives and the location of the camera, the left or right ear may be used. In one example, the 'ear to eye' angle may be the angle 1105 that is formed by a first line 1103 (that connects the left ear keypoint 1106 and the right ear keypoint 1101) and a second line 1104 (the connects the right eye keypoint 1102 and the right ear keypoint 1101).

Figure 12:
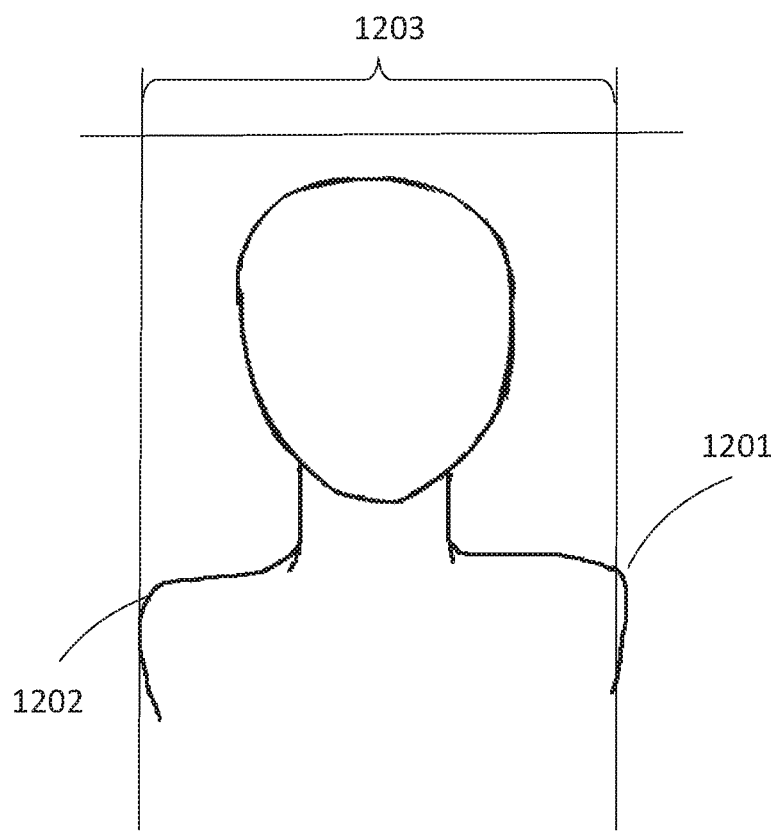
FIG. 12 illustrates example determined keypoints associated with the shoulders of a driver in accordance with certain aspects of the present disclosure.

FIG. 12 illustrates an embodiment of the aforementioned devices, systems and methods for determining alerts based on visual data from driver-facing and outward-facing visual data. In this illustration, the driver's head may be visible in the image data captured by the driver-facing camera. The system may detect a first keypoint 1202 corresponding to the right shoulder of the driver and a second keypoint 1201 corresponding to the left shoulder of the driver. From the visual data captured by the driver-facing camera, the compute device may determine a shoulder distance 1203 of the driver in each frame. Furthermore, as described above, by sampling multiple images in a preconfigured time interval, a median shoulder distance may be determined.

Additional keypoint distances are contemplated and may be useful for embodiments of the aforementioned devices, systems and methods for determining alerts based on visual data from driver-facing and outward-facing visual data. In one example and referring to FIG. 13, an 'ear to ear' keypoint distance may be calculated between a left ear keypoint 1304 and a right ear keypoint 1303. Alternatively, or in addition, an 'eye to eye' keypoint distance may be calculated between a right eye keypoint 1301 and a left eye keypoint 1302.

Furthermore, a 'nose to left ear' keypoint distance may be determined based on a nose keypoint 1306 and a left ear keypoint 1304. In an example, this would be the length of the line drawn from the keypoint 1306 to the keypoint 1304. Likewise, a 'nose to right ear' keypoint distance may be determined based on a nose keypoint 1306 and a right ear keypoint 1303.

Figure 18:
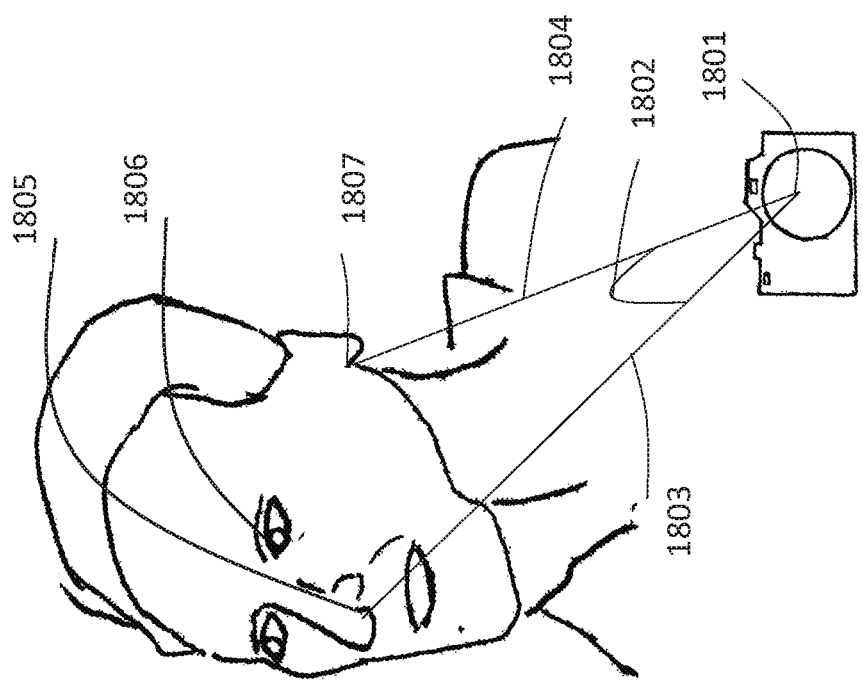
FIG. 18 illustrates another example of determined angles and/or distances between various keypoints of the driver of FIG. 17 in accordance with certain aspects of the present disclosure.
Figure 17:
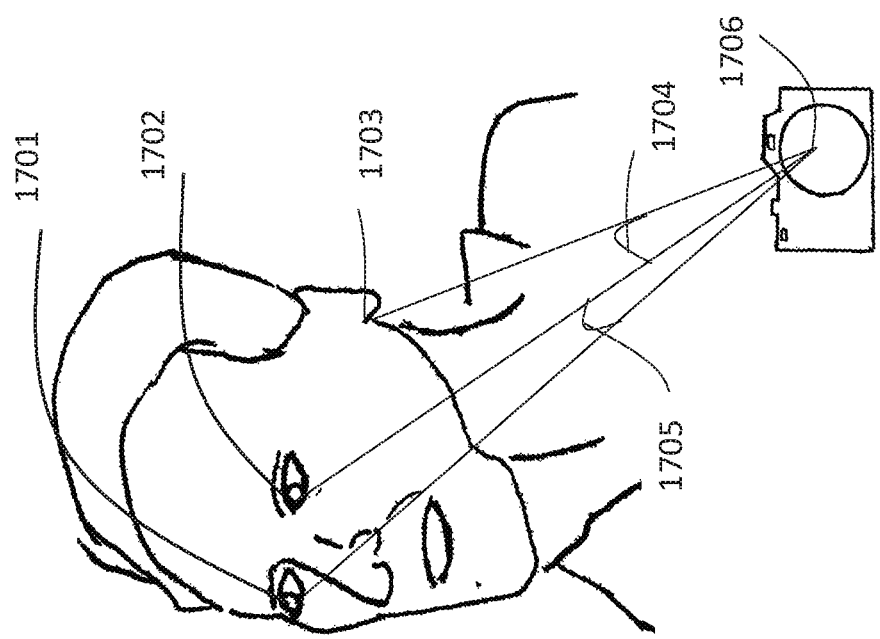
FIG. 17 illustrates example determined angles and/or distances between various keypoints associated with the eyes and an ear of a driver that is positioned at an angle with respect to a camera in accordance with certain aspects of the present disclosure.

In another embodiment and referring to FIGS. 17 and 18, a system in accordance with certain aspects of the present disclosure may be configured to determine a first keypoint 1805 corresponding to the nose of the driver and a second keypoint 1807 corresponding to the left ear of the driver. In one example, the 'nose to left ear' angle may be the angle 1802 that is formed by a first line 1803 (that connects the nose keypoint 1805 and the driver facing camera 1801) and a second line 1804 (that connects the left ear keypoint 1807 and the driver facing camera 1801). From the visual data captured by the driver-facing camera, the compute device will be able to determine the position of the camera 1801. Similarly, in FIG. 17, a first keypoint 1701 may be defined with respect to the right eye and a second keypoint 1702 may be defined with respect to the left eye. A third keypoint 1703 may be defined with respect to the driver's left ear. The driver may be captured with a camera 1706. A left ear to left eye' angle may be an angle 1704 that is formed by a first line between the camera 1706 to the third keypoint 1703 and a second line between the camera 1706 to the second keypoint 1702. A left eye to right eye' angle may be an angle 1705 that is formed by a third line between the camera. 1706 and the first keypoint 1701 and the second line. A left ear to right eye'angle may be an angle formed by the first line and the third line (e.g., the angle 1704 plus the angle 1705).

Figure 19:
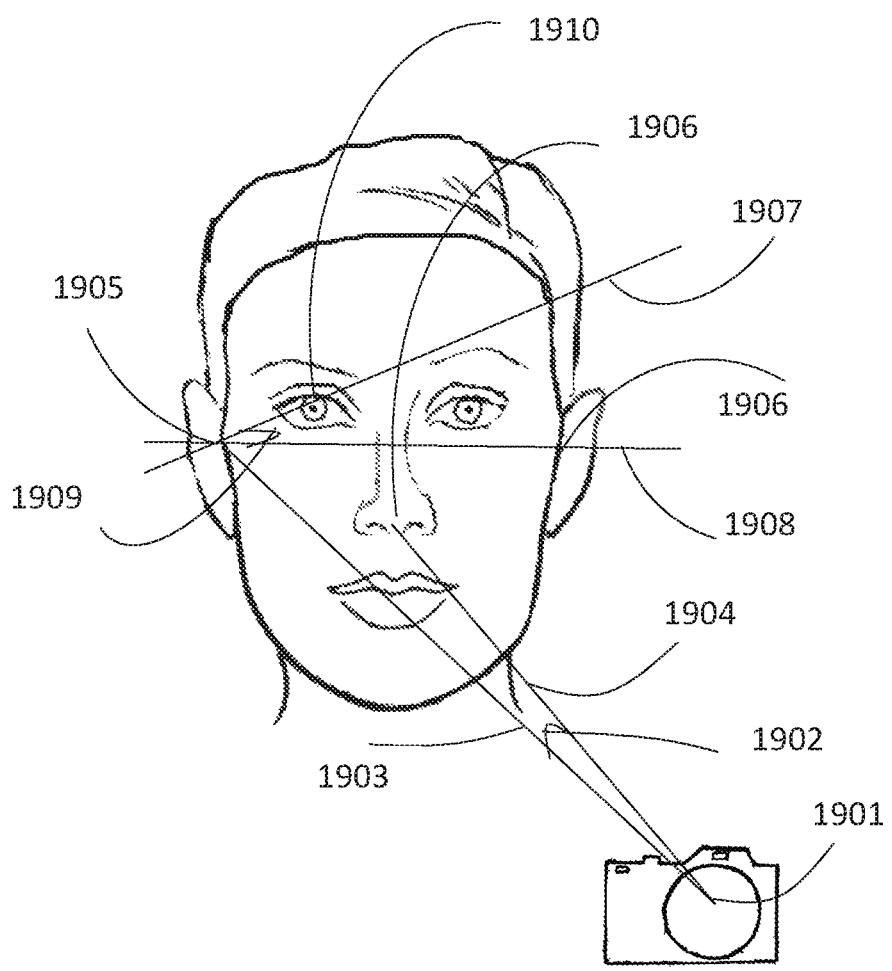
FIG. 19 illustrates example determined angles between various keypoints of a driver including the nose, ears, and right eye of the driver in accordance with certain aspects of the present disclosure.

In another example and referring to FIG. 19, a system in accordance with certain aspects of the present disclosure may be configured to determine the 'nose to right ear' angle 1902 that is formed by a first line 1903 (that connects the right ear keypoint 1905 and the driver facing camera 1901) and a second line 1904 (that connects the nose keypoint 1906 and the driver facing camera 1901).

In another example, a system in accordance with certain aspects of the present disclosure may be configured to determine a keypoint angle 1909 that is subtended at the right ear keypoint and formed between the 2 lines, the first line 1907 (that connects the right ear keypoint 1905 and the right eye keypoint 1910) and the second line 1908 (that connects the right ear keypoint 1905 and the left ear keypoint 1906).

Figure 20:
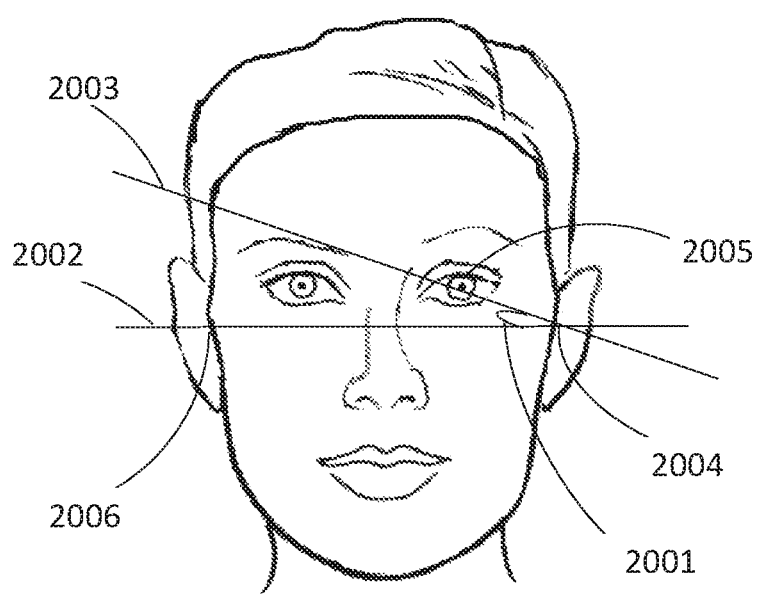
FIG. 20 illustrates an example determined angle between a right ear, left ear, and left eye keypoints of a driver in accordance with certain aspects of the present disclosure.

In another example and referring to FIG. 20, a keypoint angle may be angle 2001 that is subtended at the left ear keypoint and formed by a first line 2003 (that connects the left ear keypoint 2004 and the left eye keypoint 2005) and a second line 2002 (that connects the left ear keypoint 2004 and the right ear keypoint 2006).

Figure 21:
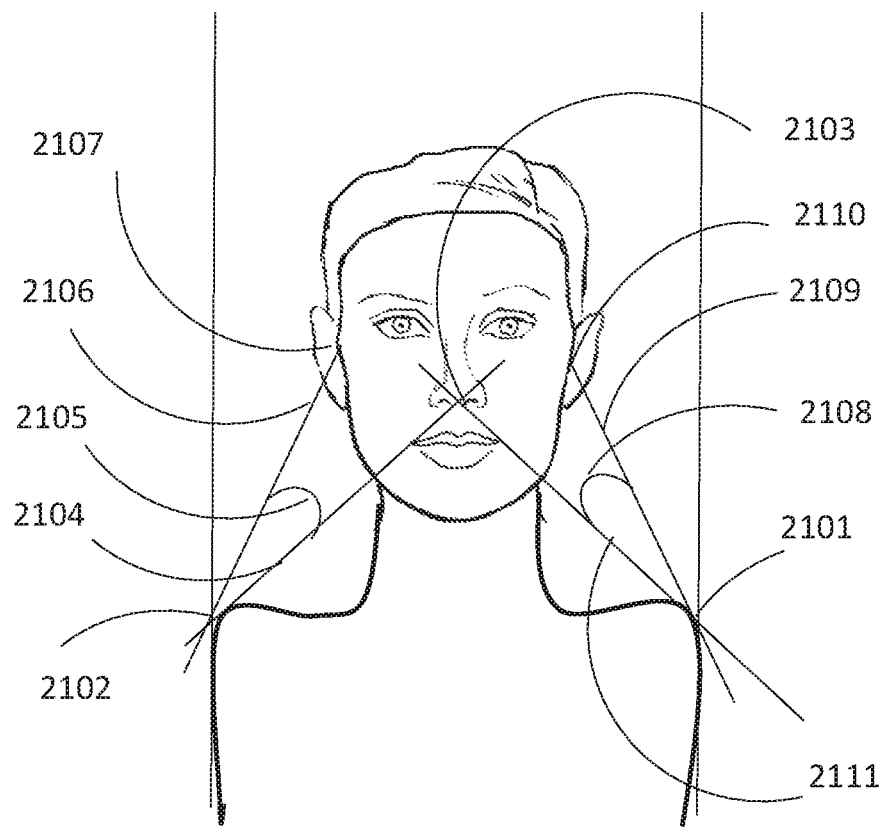
FIG. 21 illustrates example determined angles between various keypoints of a driver including the shoulders, nose, and ears of the driver in accordance with certain aspects of the present disclosure.

In another example and referring to FIG. 21, a keypoint angle may be angle 2105 that is subtended at the right shoulder keypoint 2102 and formed by a first line 2106 (that connects the right shoulder keypoint 2102 and the right ear keypoint 2107) and a second line 2104 (that connects the right shoulder keypoint 2102 and the nose keypoint 2103).

In another example referring to FIG. 21, a keypoint angle may be angle 2108 that is subtended at the left shoulder keypoint 2101 and formed by a first line 2109 (that connects the left shoulder keypoint 2101 and the left ear keypoint 2110) and a second line 2111 (that connects the left shoulder keypoint 2101 and the nose keypoint 2103).

Figure 22:
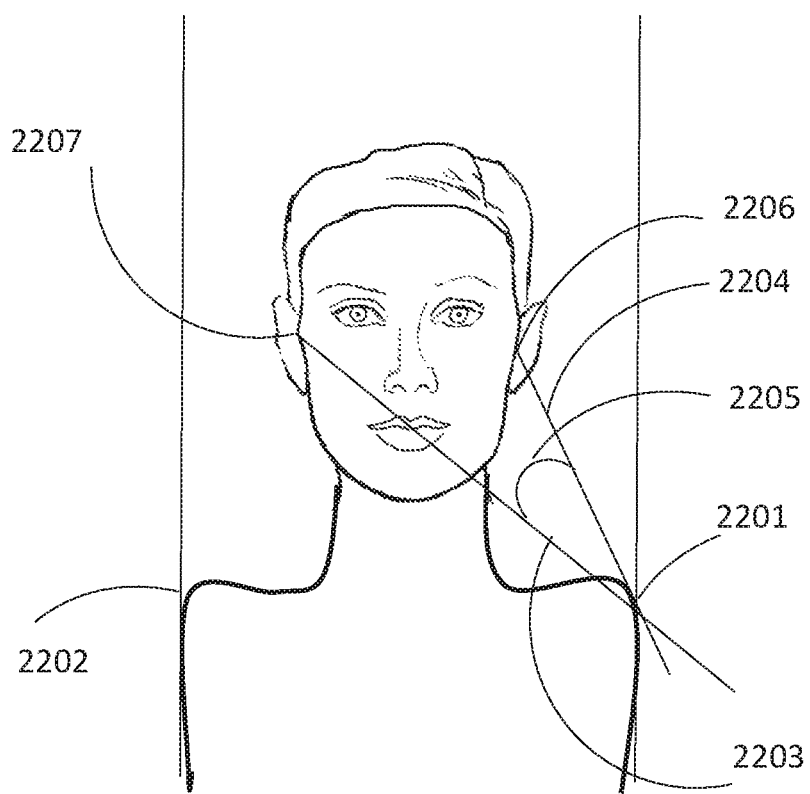
FIG. 22 illustrates an example determined angle between the ears and left shoulder keypoints of a driver in accordance with certain aspects of the present disclosure.

In another example and referring to FIG. 22, a keypoint angle may be angle 2205 that is subtended at the left shoulder keypoint 2201 and formed by a first line 2203 (that connects the left shoulder keypoint 2201 and the right ear keypoint 2207) and a second line 2204 (that connects the left shoulder keypoint 2201 and the left ear keypoint 2206).

In one embodiment, the above-mentioned angles and distances between keypoints are arranged in a sorted list, for the compute device to find the median of each of these calculated distances and angles. As an example, the compute device will determine the median for shoulder distance, a median for the eye distance, etc. In certain embodiments, there may be more keypoints that are captured from the images. The embodiment describe above is an example of a few keypoints to help in the explanation. In one embodiment, these median values are calculated continuously for every 2-minute interval. The compute device having found the median of these various values, records these median values as "effective distance or effective angle", for each of the 2-minute samples. This data may be also sent to the remote cloud based server and saved against this driver profile in a database.

In the following preconfigured time interval, which in one embodiment is 2 minutes, the in-vehicle compute device on receiving the next 600 images at 5 FPS from the driver facing camera, repeats the same process as above and finds a new "effective distance or effective angle" for this next 2 minute interval.

In one embodiment, the various angles and distances between keypoints are captured once the vehicle attains a preconfigured speed, of 15 miles per hour.

In one embodiment, once the compute device has calculated the "effective distance or effective angle" of all the various distances and angles between the keypoints in a preconfigured sample time of 2 minutes, it starts image processing of the next 600 samples received from the camera for the next 2 minutes of sample time. For each sample received in this following 2 minute interval, all the distances and angles are compared to their respective "effective distances or effective angle values", calculated in the previous 2 minute interval.

In one embodiment, the various distances and angles between keypoints, when compared to the "effective distance or effective angle" values calculated from the previous sample will enable the compute device to detect the pose and gaze of the driver and the driver's movement relative to the last calculated "effective distances or effective angle values". For example, if the Nose to Shoulder distance is less than a certain factor compared to the "effective distance" of the Nose to Shoulder from the previous time period, it indicates that the driver is looking down.

FIG. 13 shows the keypoints to calculate the vertical distance between the eyes and ears. In this illustration, the driver's head may be visible in the image data captured by the driver-facing camera. In one embodiment, a system in accordance with certain aspects of the present disclosure may be configured to determine a first keypoint 1301 corresponding to the right eye of the driver and a second keypoint 1302 corresponding to the left eye of the driver. The system may also determine a third keypoint 1303 corresponding to the right ear of the driver and a fourth keypoint 1305 corresponding to the left ear of the driver. In one example, the "eye to ear vertical distance" 1305 will be the distance between the 2 horizontal lines that is formed by a first line (that connects the right eye keypoint 1301 and the left eye keypoint 1302) and a second line (that connects the right ear keypoint 1303 and the left ear keypoint 1304). This 'eye to ear vertical distance' in one example may be used to detect the up and down movement of the head of the driver.

FIG. 14 shows the keypoints to calculate the vertical distance between the eyes and ears in an embodiment that shows the above 'eye to ear distance' decreasing as the driver looks down. In this example, the system determines the 'eye to ear vertical distance" 1405 is the distance between the 2 horizontal lines that is formed by a first line (that connects the right eye keypoint 1401 and the left eye keypoint 1402) and a second line (that connects the right ear keypoint 1403 and the left ear keypoint 1404). This 'eye to ear vertical distance' decreases from the perspective of the driver facing camera, as the driver looks down. In one embodiment, this method may be one way to detect down and up movement of the head of the driver. In certain aspects of the present disclosure, this head movement may be correlated to other events to detect and warn on anomalies.

Figure 15:
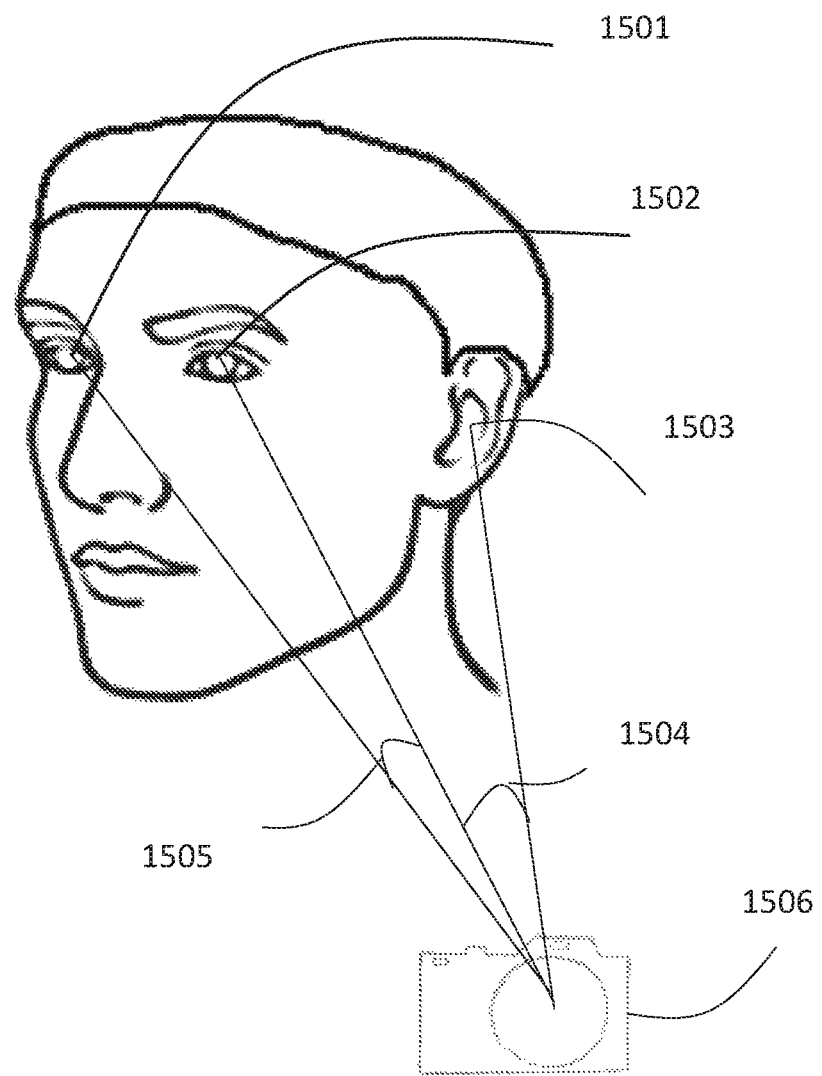
FIG. 15 illustrates example determined keypoints associated with the eyes and an ear of a driver that is positioned at an angle with respect to a camera in accordance with certain aspects of the present disclosure.

FIG. 15 shows the keypoints of a driver looking straight ahead, with the driver facing camera mounted in a specific position in the vehicle. In one embodiment, the camera is mounted on the top left side of the driver near the front windscreen of the vehicle. In this illustration, the driver's head may be visible in the image data captured by the driver-facing camera. In one embodiment, capturing the keypoints of the face and upper body of the driver, as seen from a specific mount position of the camera, helps provide the natural posture and gaze of the driver as he is looking straight forward from the vehicle. In one embodiment, the system determines the 'eye angle' 1505 that is the angle between the 2 lines that is formed by a first line (that connects the right eye keypoint 1501 and the driver facing camera 1506) and a second line (that connects the left eye keypoint 1502 and the driver facing camera 1506). In one example, this 'eye angle' is determined and noted by the compute device, for a driver that is looking straight ahead. The system also determines the 'eye to ear angle' 1504 as the angle between the 2 lines that is formed by a first line (that connects the left eye keypoint 1502 and the driver facing camera 1506) and a second line (that connects the left ear keypoint 1503 and the driver facing camera 1506). The 'eye angle' and 'eye to ear angle' values, in one embodiment are used by the compute device to determine the normal values that indicate the driver is looking straight ahead. Furthermore, as described above, by sampling multiple images in a preconfigured time interval, a median 'eye angle' and 'eye to ear angle' angles may be determined that may be used as reference values when the compute device is trying to detect changes to the pose and gaze of the driver.

Figure 16:
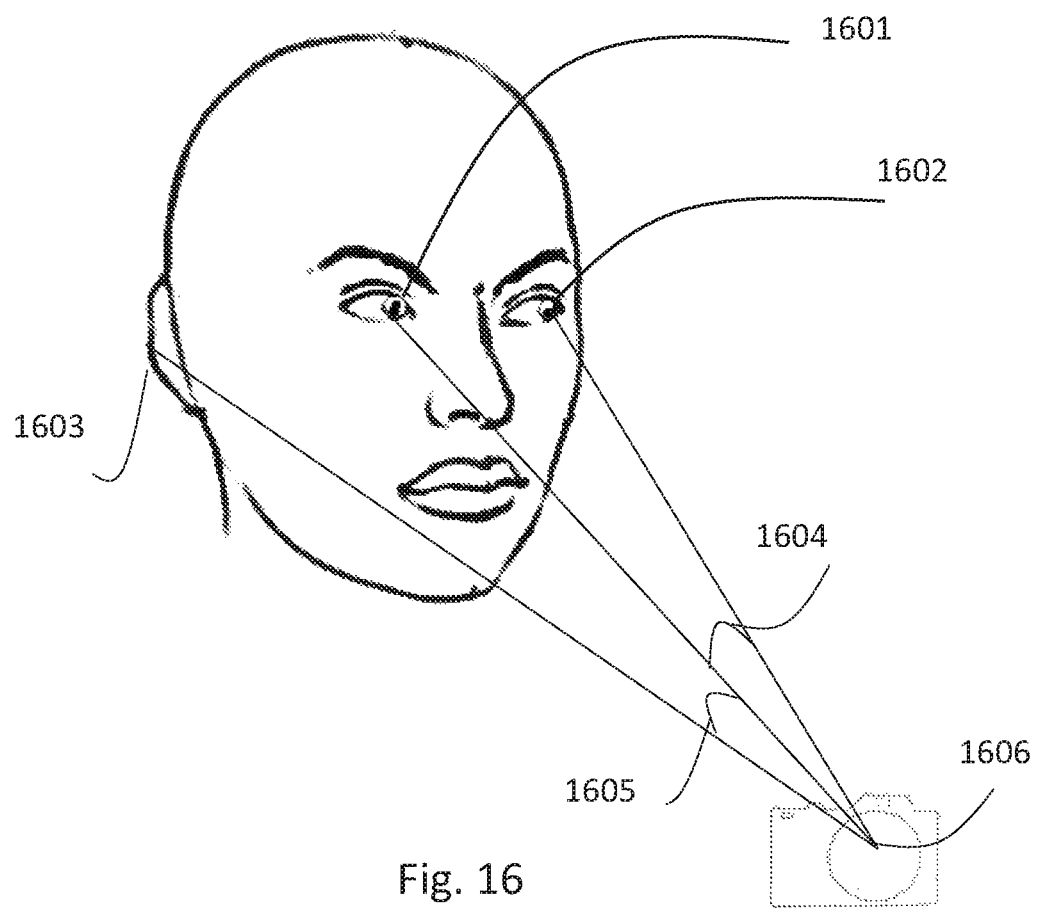
FIG. 16 illustrates another example of determined keypoints associated with the eyes and an ear of a driver that is positioned at an angle with respect to a camera in accordance with certain aspects of the present disclosure.

FIG. 16 show the keypoints of a driver looking towards his left, with the driver facing camera mounted in a specific position in the vehicle. In one embodiment, the camera is mounted on the top left side of the driver near the front windscreen of the vehicle. In this illustration, the driver's head may be visible in the image data captured by the driver-facing camera. In one embodiment, the system determines the 'eye angle' 1604 that is the angle between the 2 lines that is formed by a first line (that connects the right eye keypoint 1601 and the driver facing camera 1606) and a second line (that connects the left eye keypoint 1602 and the driver facing camera 1606). The system may also determine in one example the 'eye to ear angle' 1605 that is the angle between the 2 lines that is formed by a first line (that connects the right eye keypoint 1601 and the driver facing camera 1606) and a second line (that connects the right ear keypoint 1603 and the driver facing camera 1606). These angles 'eye angle' and 'eye to ear angle' are computed and saved by sampling multiple images in a preconfigured time interval using the images captured by the driver facing camera 1606. In one embodiment an increase in the value of these angles indicate that the driver is looking towards his left.

In some embodiments, the compute device may calculate pose as a multitude of distance and angle values between various keypoints, as discussed above. The current pose may be calculated at every sample interval of time and when the various keypoint distances and values are compared to the "effective distance or effective angle values", of the previous preconfigured time interval, the compute device may determine the current pose. The collection of various keypoints that determine the current pose may be given a reference name, like, leaning forward, leaning backward, slouching down, back slumped down indicating sleeping or drowsy pose.

Similarly the current gaze and movement in gaze may now be calculated at every sample interval of time. When these various distance and angle values between keypoints are compared to the "effective distance or effective angle" of the previous preconfigured time interval, the compute device may detect change of the direction of gaze of the driver.

In one embodiment, the compute device may use the above calculated median values "effective distance or effective angle values", and corroborate this data with other data that is being retrieved by onboard sensors and other cameras. In one example, if the driver gaze is being calculated to be looking left, and the vehicle is turning left, as determined by road facing cameras, then there is no inattentiveness and the driver need not be alerted for this detection of gaze movement.

To further make the gaze detection more accurate, multiple measurements may be checked against each other. In one embodiment, the direction the head is turning may be detected by the compute device reading multiple keypoint values. In one embodiment, if the Left Eye to the Left Ear distance reduces from its "effective distance" as calculated in the last sample, then the compute device may detect this as a head movement towards the left side. This left movement of the head may also be checked by the monitoring the distance between the keypoints of Left and Right Eyes, i.e. 'eye distance'. In one embodiment, if the 'eye distance' distance increases, then the Head may be turning towards the camera and if the camera is positioned on the left of the driver, it indicates that the driver's head is turning left. Thus, the compute device may look at multiple keypoints to come to a conclusion that the movement of the head is in a certain direction. Multiple keypoint data helps the compute device to increase confidence on the head movement and give a more accurate gaze direction.

The shoulder distance increasing in value indicates that the driver is leaning forward, and may or may not be anomaly depending on the other data that is being read by onboard sensors and other cameras. For example, if the vehicle breaks are being applied, there will be a slight movement of the driver towards the steering wheel given the laws of motion, and an increase of shoulder distance detection at the compute device will not be an anomaly, and will not cause an alarm, since the other sensor readings will indicate to the compute device a vehicle breaking condition.

In one embodiment, for gaze detection, the compute device may do an image processing of other well-known Landmarks on the face, which may be a multitude of points on the face. These other Facial Landmarks may be certain keypoints points on the face which have an impact on subsequent task focused on the face, such as gaze detection. The Facial Landmarks may be nose tip, corners of the eyes, chin, mouth corners, eyebrow arcs, ear lobes etc. The keypoints gathered by image processing of distances and angles of the various landmarks on the face of the driver, will be able to give a more accurate picture of both the gaze and pose of the driver.

Once the compute data has all the data from the above, it may generate a driver profile and save this data with the type of the vehicle, and the driver profile, in a database on a cloud server to be used for later usage. The data so collected may then be normalized in accordance with certain aspects of the present disclosure. Accordingly, the normalized data may account for the position of the mounting of the camera, the vehicle type in which the camera was mounted, and the like.

Inward/Outward Alert Enhancement

Intelligent in-cab warnings may help prevent or reduce vehicular accidents. In-cab warnings of unsafe events before or during the traffic event may enable the driver to take action to avoid an accident. In-cab warnings shortly after unsafe events have occurred may enable the driver to self-coach and learn from the event and how to avoid similar events in the future.

Industry standard ADAS in-cab alerts based on the outward environment include forward collision warnings (FCW) and lane departure warnings (LDW). In-cab alerts based on the inward environment include drowsy driving. An NTSB study found that many drivers disable current state-of-the-art LDW systems due to too many unhelpful alerts.

First, current alerts may "cry wolf" too often when they are not needed, and cause drivers to ignore or turn-off the alerts reducing or removing their effectiveness. Second, are unsafe driving situations not currently handled. Certain aspects of the present disclosure provide novel approaches to addressing such issues.

In a first is a series of embodiments, inward and outward determinations may be combined to improve in-cab alerts. Accordingly, unnecessary alerts may be reduced, and consequently more alerts may feel actionable to the driver leading the driver to respond to the alerts more attentively and to keep the alerts active. According to certain aspects of the present disclosure, an earlier warning may be provided if the driver is distracted or determined to not be observing what is happening.

According to certain aspects, a Forward Collision Warning (FCW) Alert may be enhanced by taking into account a determination of the driver's level of distraction. In current state-of-the-art systems, an FCW alert may be given if the time to collision with a vehicle in front drops below a threshold value based on the relative speed of the vehicles. According to certain aspects of the present disclosure, and FCW may be enhanced. In one embodiment it may be determined if the driver is currently looking forward or not, and based on that determination adjust the threshold time to collision before sounding the alert. For example, if the driver is looking in a direction other than forward, then if the time to collision is 2.1 sec a FCW is sounded. If the driver is looking forward likely seeing the vehicle, then the alert threshold may be 1.6 seconds. This affords the driver more time to respond when already observing what is happening and reduces the number of "crying wolf" alerts that are just alerting the driver to what they are already observing.

In an alternative embodiment of certain aspects of the present disclosure, an FCW threshold may be kept at 2.1 sec when the driver is determined to be looking forward, and increased to 2.6 sec when the driver is looking elsewhere or determined to be distracted, to give the driver more time to react as he/she needs to look forward and understand the scene.

In the base-line of this feature the driver may be determined to be distracted based sole on determining the drivers gaze or head direction to be looking forward. A further enhancement may include determining if the angle of the driver's gaze is in the direction of the object of interest to determine if the driver may be perceiving that object. The driver's gaze may be determined using computer vision techniques.

A state-of-the-art Lane Departure Warning (LDW) may be triggered if a vehicle leaves its lane of travel. This creates a lot of "cry wolf" events, as every lane change is alerted. The system may determine if a turn signal is on when the lane change occurs, so that only lane changes that occur when the turn signal is off may be alerted. According to certain aspects of the present disclosure, an inward camera may also be used to determine if the driver makes a shoulder check gaze in the direction of lane change before changing lanes, and suppressing the alert if such a maneuver is made. This may reduce the number of intended lane changes that trigger a "cry-wolf" alert sound.

Further, even if a driver signals a lane change, but is determined to not have checked that the lane is clear before changing lanes, then a coaching alert may be made after the lane change. Gaze detection in the earlier section of 'Gaze and Pose Detection' would help correlate the driver movements with movements the vehicle is making, like lane changes, and if the gaze of the driver looked in that direction before the lane change.

In another embodiment there may be an adjustable threshold concerning how long to wait while a driver looks away from the road before alerting the driver to their distracted state. In one embodiment, the threshold time may be a function of the outward scene with two threshold times. If the road ahead of the driver does not have any vehicles within a given distance of travel time, and the driver is maintaining his/her lane position, then the threshold time that the driver may look away from the road before an alert is sounded may be set to the long threshold time. If there are vehicles detected in the road ahead or the lane position varies by more than a set threshold, then the short threshold time may be used.

In another embodiment, the use of a mobile phone by a driver may be monitored by the driver facing camera with the gaze detection methods in the previous section of 'Gaze and Pose Detection'. A warning may be issued to the driver if the threshold time of the downward gaze towards the mobile phone is longer than a pre-configured safety period. In another embodiment, in case the outer looking camera is showing other vehicles close to this vehicle and if the speed of the vehicle is above a certain threshold limit (e.g., 15 miles per hour), an alert message may be issued to the driver and logged in the compute device and remote cloud server.

Another embodiment may use a series of threshold times or a threshold function that takes as inputs one or more of the distance to the nearest vehicle, number of vehicles on the road, lane position, vehicle speed, pedestrians present, road type, weather, time of day, and the like, to determine a threshold time.

Many other alert thresholds are contemplated for which the threshold may be varied for inward alerts based on the determination of the outward scene complexity, and vice versa. That is, the threshold of an outward alert may be based on a determination of the inward scene complexity. In addition, there are a number of additional unsafe driving events that may be captured and that may be a basis for issuing a warning alert to the driver. Several examples are described in detail below.

Red Light Ahead

According to certain aspects of the present disclosure, a red-light ahead alert may be enhanced. In one embodiment, a vision system may detect a traffic light in front of the vehicle, and may determine the traffic light state as green, yellow, or red. A determination of the distance to the traffic light is made in one of many ways, such as GPS determined location against a map, visual distance to the intersection based on size of objects in pixels and known object sizes, distance to the intersection based on camera known intrinsics and extrinsics and intersection threshold compared to vanishing point, radar based distance measurements, stereo vision measurements, or other approaches, as well as combinations of techniques and approaches. A determination of the vehicle speed may be made using UPS measurements, built-in vehicle speed indications based on wheel rotations, vision odometry, inertials, or other methods, or combinations of methods. In a base-line embodiment, if the time to the intersection determined based on the vehicle speed and intersection distance drops below a threshold value and the traffic light state is red, then a red light ahead alert is sounded.

In another embodiment, the threshold value may varied based on a determination of driver distractedness and/or determination of scene complexity.

In still another embodiment, a traffic light state machine model may be used, either a location-agnostic model or a location-specific model based on the region around traffic lights and/or the specific traffic light intersection. A simple model may predict an expected time from when the light turns yellow until the light turns red. Based on this time, then in this embodiment, even if the light is yellow, if it is determined that the light will turn red before the vehicle enters the intersection then a red light ahead alert may be triggered.

In some embodiments, the model may be used to determine a stale green light that would be used to estimate if the light would turn red before the vehicle would arrive.

In still another embodiment, rather than the time to the intersection, another function of the distance and/or speed may be used. For example, if the distance to the intersection is less than a threshold and the speed is above a threshold, then a determination may be made.

In an additional embodiment, if the driver presses on the brake, which may be determined either by a CANBUS or vehicle indication that the brake was pressed, by an inertial sensor based determination, or by a UPS speed measurement decreasing, or some combination, then the red light ahead alert may be suppressed since this may be an indication that the driver is already aware of the red light ahead. In a variation of this embodiment, the threshold time to the red light may be reduced, and the alert still triggered if the driver goes below that reduced threshold.

In an additional embodiment, an outward camera or vehicle determined position applied to a map may be used to determine which lane the vehicle is traveling in, such as left turn, straight ahead, or right turn lane. Or alternatively, the system or method may incorporate driver indications, such as turn signs, to then further determine the drivers intended actions and further map the appropriate traffic light for the red-light ahead alert. For example, if the driver is traveling in the left turn lane and the left turn lane turn arrow light is red while the straight ahead light is green, and the time to intersection crossing may be less than the threshold then a red light ahead alert may be triggered driver.

Light Turned Green

With the increase in driver distraction, there are increasing occurrences where a driver is stopped at a red light, distracted and looking away from the light, and does not notice that the light turned green. This may increase the risk of a rear-end collision if a driver behind doesn't realize the distracted driver hasn't started move despite the green light. This may also cause frustrations for other drivers behind the driver and risk of road rage.

According to certain aspects of the present disclosure, a light-turned green alert may let the driver know that the light has turned green. In a baseline embodiment, a vehicle mounted camera looking forward may determine that the vehicle is stopped at an intersection with a red light. When the visual detector detects that the light turns green an alert is triggered for the driver.

Furthermore, in some embodiments, the time that the light is green and the vehicle is not moving may be determined. If that time goes above a threshold, then an alert is triggered. This may reduce the frequency of "cry-wolf" alerts.

In another embodiment, an inward camera may determine if the driver is distracted, and only trigger a light-turned-green alert if the driver is determined to not be looking forward. Further, if a threshold time from the green light is being used, then the driver distraction may be used to determine the threshold time until a light-turned-green alert is triggered. Accordingly, a driver looking forward would have a longer time than a distracted driver before an alert is given.

In a further enhancement, a traffic light model may be used to estimate when the red light might turn green based on noting when the light turned red, and potentially other determined features, such as the specific intersection or general location statistics, vehicle movements for the cross traffic, and or turning traffic, among others. Then a pre-alert may be triggered to the driver that the light is about to turn green. This pre-alert may be modified or suppressed based on a driver distracted determination.

In another embodiment, the outward camera or determined position applied to a map may determine the lane or characteristic of the intersection lane that the vehicle is in, such as a left turn lane, straight ahead lane, or right turn lane, and then maps and uses the appropriate traffic lights for determining the light-turned-green alert.

Train Tracks Ahead Alert or Stop Sign Ahead Alert

Many types of vehicles are required to stop at all train tracks, such as school buses and vehicles carrying hazardous cargo. Additionally, all vehicles are required to stop at stop signs.

According to certain aspects of the present disclosure, a Train Track Ahead Alert or Stop Sign Ahead alerts the driver if configured to warn for train tracks ahead and/or stop sign ahead. In a baseline version it may alert whenever the driver approaches the intersection of train tracks or stop sign. The train tracks and/or stop sim may be determined by visual detection from a camera of signs or features indicating the intersection or by mapping the vehicle position on to a map indicating the intersection.

Additional embodiments may be similar to the embodiments of the red light ahead warning alert, such as measuring the vehicle speed and distance to the intersection to determine a time to the intersection and sounding the alert if the time to the intersection goes below a threshold. Further, varying that threshold based on a determination of driver distractedness.

Audio Features for Alerts

In determining the inward scene complexity and/or outward scene complexity an audio sensor may be used to help determine the scene complexity.

In the above examples, distracted driving was used an example of a broader class of inward scene metrics, which may be referred to as an inward scene complexity. That complexity may include distractions due to driver looking in the cab, shoulder checking, eating food, talking on the phone (hands free or in hands), playing with the radio, texting, talking to other passengers, being drowsy, sleeping, handling children, among other elements.

An audio sensor such as one or more microphones may be used to help determine both inward and outward scene complexity. For example, the sound of cars screeching, sirens from emergency vehicles, and honking may indicate different levels of outward scene complexity. Similarly, sounds of the radio playing, conversations, driver talking, babies crying, among others may indicate different levels of inward scene complexity. In an embodiment a classification of an audio signal may be used to determine the presence of each of these or other events. Then the scene complexity indication function may take these into account and therefore impact the thresholds.

In one embodiment, if the driver is detected as talking with a passenger, then a higher cognitive load may be assumed for the driver and an assumed slower reaction time, so a the FCW may have a higher threshold to give an earlier warning.

In an embodiment for the light turned green warning, if a car horn is detected then it may be assumed that the driver has heard an implied external alert of that horn, so a higher threshold for a longer duration of green may be used before alerting the driver.

In another embodiment, if a siren is heard, then the light-is-green warning may be suppressed so as not to accidentally encourage the driver to disrupt an emergency vehicle.

Enhancements of Internally Focused Alerts with External or IMU Inputs

According to certain aspects of the present disclosure, internally focused alerts such as distracted or drowsy detection may be enhanced based on Inertial Measurement Unit input and/or outward facing camera input. One embodiment may include confirming or changing drowsy thresholds based on decreasing speed (drifting off to sleep and slowing down). A second embodiment may include confirming or changing drowsy thresholds based on lack of steering input (lack of lateral IMU) steering correction prior to lane drift. A third embodiment may include confirming or changing drowsy thresholds based on lack of other vehicles on the road/low ambient light/trip length (time or ratio) since vehicle has "seen" another vehicle in frame.

Additional Embodiments

At least some aspects of the present disclosure will now be described with reference to the following numbered clauses:

Clause 1. A method, comprising: determining an indication of an inward driving scene complexity; adjusting at least one safety threshold based on the determined indication; and determining a potentially unsafe driving maneuver or situation based on that at least one safety threshold.

Clause 2. The method of clause 1, wherein the indication is based on a level and/or type of distracted driving behavior.

Clause 3. The method of clause 1, wherein the safety threshold corresponds to an outward driving scene.

Clause 4. A method comprising: determining an indication of an outward driving scene complexity; adjusting at least one safety threshold based on the determined indication; and determining a potentially unsafe driving maneuver or situation based on that at least one safety threshold.

Clause 5. The method of clause 4, wherein the safety threshold corresponds to an inward driving scene.

Clause 6. The method of clause 1 or clause 4, wherein the potentially unsafe driving maneuver comprises at least one of a forward collision warning, a lane departure warning, a red-light ahead warning, a railroad crossing ahead warning, a stop sign ahead warning, and a driver distracted warning.

Clause 7. A method, comprising: determining an indication of an inward driving scene; adjusting at least one safety threshold based on the indication; and detecting an occurrence of a driving event based at least in part on the adjusted at least one safety threshold.

Clause 8. The method of clause 7, further comprising: transmitting event data to a remote server based on the determined occurrence of the driving event.

Clause 9. The method of clause 7, further comprising: triggering an audible or visual alert based on the determined occurrence of the driving event.

Clause 10. The method of clause 7, wherein the indication of an inward driving scene corresponds to at least one of a gaze direction of a driver, a presence of a communication device, an absence of a fastened seatbelt, or a frequency of yawning, talking, or blinking.

Clause 11. The method of clause 7, wherein the safety threshold corresponds to at least one of a speed; a distance from a traffic light; a distance from an intersection; a distance from a stop sign; a distance to a railroad crossing; a lateral velocity; a distance from a lane or a road boundary; a lateral distance from a vehicle in an adjacent lane; a forward distance to an obstacle; or a speed of the obstacle.

Clause 12. The method of clause 7, wherein the driving event is at least one of a traffic-light crossing, a stop sign crossing, a railroad crossing, a lane departure, or a potentially unsafe following distance.

Clause 13. The method of clause 7, wherein the inward driving scene corresponds to a driver performing a visual check in the direction of a lane change; the driving event is a potentially unsafe lane departure; and the safety threshold is adjusted so that the detection of a potentially unsafe lane departure event is suppressed.

Clause 14. A method comprising: determining an indication of an outward driving scene; adjusting at least one safety threshold based on the indication; and determining an occurrence of a driving event based at least in part on the adjusted at least one safety threshold.

Clause 15. The method of clause 14, further comprising: transmitting event data to a remote server based on the determined occurrence of the driving event.

Clause 16. The method of clause 14, further comprising: triggering an audible or visual alert based on the determined occurrence of the driving event.

Clause 17. The method of clause 14, wherein the indicated outward driving scene corresponds to at least one of: a location of a traffic light, an illuminated color of the traffic the traffic light, an elapsed time since a change in the illuminated color of the traffic light, or a driver's speed.

Clause 18. The method of clause 14, wherein the indication of an outward driving scene corresponds to at least one of a lateral velocity; a distance from a lane or a road boundary; or a lateral distance from a vehicle in an adjacent lane.

Clause 19. The method of clause 18, wherein the safety threshold corresponds to at least one of a gaze direction of a driver or a duration of a deviated gaze direction.

Clause 20. The method of clause 14, wherein the driving event corresponds to at least one of distracted driving, drowsy driving, a driver failure to check a blind-spot prior to a lane change, a driver performing a visual check in the direction of a lane change Clause 21. A method of calibrating a driver-facing camera, comprising: receiving image data from a camera coupled to a vehicle; locating a plurality of keypoints in the image data, wherein a first keypoint of the plurality of keypoints corresponds to a location on a driver of the vehicle; determining a distance between the first keypoint and a second keypoint from the plurality of keypoints; determining a speed of the vehicle; and updating an estimated typical distance between the first keypoint and the second keypoint based on the determined distance, when the determined speed is above a predetermined threshold.

Clause 22. The method of clause 21, wherein the first keypoint corresponds to a location in the image data corresponding to a first shoulder of the driver, and the second keypoint corresponds to a location in the image data corresponding to a second shoulder of the driver.

Clause 23. The method of clause 21, further comprising: receiving a second image data from the camera; determining a second distance between a pair of keypoints in the second image data, wherein the pair of keypoints in the second image data corresponds to the first keypoint and the second keypoint in the image data; determining a scaling factor based on the determined second distance and the estimated typical distance.

Clause 24. The method of clause 23, further comprising: determining a third distance between a third pair of keypoints; and determining a deviation from a typical pose based at least in part on the third distance and the scaling factor.

Clause 25. The method of clause 24, wherein the third pair of keypoints corresponds to two eyes of the driver; and further comprising: determining a gaze direction of the driver based on the distance between the two eyes in the second image data, and estimated typical distance between the two eyes, and the scaling factor.

Clause 26. The method of clause 25, wherein the determined gaze direction is further based on a distance between a detected ear of the driver and a detected nose of the driver.

Clause 27. The method of clause 24, further comprising: alerting the driver based on whether the determined deviation exceeds a predetermined threshold.

Clause 28. The method of clause 27, wherein alerting the driver comprises audio feedback to the driver.

Clause 29. The method of clause 27, wherein alerting the driver comprising transmitting alert data to a remote server, so that the driver or an agent of the driver may review the alert data.

Clause 30. The method of clause 27, further comprising: receiving outward image data from a road-facing camera coupled to the vehicle; determining a driving behavior based at least in part on the outward image data; and wherein alerting the driver is further based on the determined driving behavior.

Clause 31. The method of clause 21, wherein the deviation from the typical pose corresponds to the driver looking in the direction of a lane change, and wherein the driving behavior is the lane change.

Clause 32. The method of clause 21, wherein updating an estimated typical distance comprises determining a median of determined distances between keypoints corresponding to the first keypoint and the second keypoint.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g, accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein may be downloaded and/or otherwise obtained by a user terminal and/or base station as applicable. For example, such a device may be coupled to a server to facilitate the transfer of means for performing the methods described herein. Alternatively, various methods described herein may be provided via storage means (e.g., RAM, ROM, a physical storage medium such as a thumb drive, etc.), such that a user terminal and/or base station may obtain the various methods upon coupling or providing the storage means to the device. Moreover, any other suitable technique for providing the methods and techniques described herein to a device may be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method comprising:
capturing, by at least one processor of a computing device with an outward facing camera, first visual data outside of a vehicle;
determining, by the at least one processor based on the first visual data, a potentially unsafe driving condition outside of the vehicle;
capturing, by the at least one processor with a driver facing camera, second visual data of a driver of the vehicle;
determining, by the at least one processor based on the second visual data, whether the driver is looking toward the potentially unsafe driving condition or away from the potentially unsafe driving condition;
activating, by the at least one processor, an in-vehicle alert in response to determining the potentially unsafe driving condition, that the driver is looking away from the potentially unsafe driving condition, and that an amount of time in which the vehicle will encounter the potentially unsafe driving condition satisfies a first threshold of time; and
transmitting, by the at least one processor to a remote server located remotely from the vehicle, a remote alert in response to the determination that the driver is not looking toward the potentially unsafe driving condition and after the in-vehicle alert is activated.

2. The method of claim 1, wherein determining whether the driver is looking toward the potentially unsafe driving condition comprises monitoring, by the at least one processor based on the second visual data, at least one of a pose of the driver or a gaze of the driver.

3. The method of claim 2, wherein monitoring at least one of the pose of the driver or the gaze of the driver comprises:
locating, by the at least one processor, a plurality of keypoints associated with the driver in the second visual data; and
determining, by the at least one processor, a distance between a first keypoint and a second keypoint of the plurality of keypoints at a first time before the determination of the potentially unsafe driving condition.

4. The method of claim 3, wherein the first keypoint corresponds to a first location in the visual data corresponding to a first shoulder of the driver and the second keypoint corresponds to a second location in the second visual data corresponding to a second shoulder of the driver.

5. The method of claim 3, wherein determining the distance between the first keypoint and the second keypoint comprises:
determining, over a predetermined amount of time, a plurality of distances between the first keypoint and the second keypoint; and
determining a median of the plurality of determined distances.

6. The method of claim 3, wherein the monitoring at least one of the pose of the driver or the gaze of the driver further comprises:

determining, by the at least one processor, a second distance between the first keypoint and the second keypoint at a second time; and determining, by the at least one processor, a scaling factor based on the second distance and the distance.

7. The method of claim 6, wherein the monitoring at least one of the pose of the driver or the gaze of the driver further comprises:

determining, by the at least one processor, a third distance between a third keypoint and a fourth keypoint; and determining, by the at least one processor, a deviation from a driver pose based at least in part on the third distance and the scaling factor.

8. The method of claim 7, wherein the third keypoint corresponds to a third location in the second visual data corresponding to a first eye of the driver and the fourth keypoint corresponds to a fourth location in the second visual data corresponding to a second eye of the driver.

9. The method of claim 8, further comprising:

determining, by the at least one processor, a distance between the third keypoint and the fourth keypoint; and determining the gaze of the driver based on the third distance, the distance between the third keypoint and the fourth keypoint, and the scaling factor.

10. The method of claim 9, wherein the gaze is further determined based on a determined angle or distance between an ear of the driver and a nose of the driver.

11. The method of claim 1, further comprising:

receiving, by the at least one processor from a remote driver monitoring device, a request for live video captured by at least one of the outward facing camera or the driver facing camera, wherein the request is received after transmission of the remote alert; and transmitting, by the at least one processor in response to the request, the live video captured by at least one of the outward facing camera or the driver facing camera.

12. The method of claim 1, wherein the in-vehicle alert is an audio alert played through a speaker in the vehicle, a visual alert on a display in the vehicle, or a light in the vehicle.

13. The method of claim 1, further comprising transmitting, by the at least one processor to the remote server, the first visual data, the second visual data, and information about the in-vehicle alert and whether the driver is looking toward the potentially unsafe driving condition.

14. The method of claim 1, wherein the amount of time in which the vehicle will encounter the potentially unsafe driving condition is determined based on at least one of a speed of the vehicle, a distance from the vehicle to an object associated with the potentially unsafe driving condition, or a speed of the object associated with the potentially unsafe driving condition.

15. The method of claim 14, wherein the object associated with the potentially unsafe driving condition is one of a traffic light, a stop sign, an intersection, a railroad crossing, a lane or road boundary, or a second vehicle.

16. The method of claim 1, wherein the determination of whether the driver is looking toward the potentially unsafe driving condition or away from the potentially unsafe driving condition comprises monitoring, by the at least one processor based on the second visual data, at least one of a pose of the driver or a gaze of the driver.

17. A method comprising:

capturing, by at least one processor of a computing device with an outward facing camera, first visual data outside of a vehicle;

determining, by the at least one processor based on the first visual data, a potentially unsafe driving condition outside of the vehicle and an amount of time in which the vehicle will encounter the potentially unsafe driving condition;

capturing, by the at least one processor with a driver facing camera, second visual data of a driver of the vehicle;

determining, by the at least one processor based on the second visual data, whether the driver has looked in a direction of the potentially unsafe driving condition within a predetermined threshold of time of the determination of unsafe driving condition, wherein:

an in-vehicle alert is suppressed when the driver has looked in the direction of the potentially unsafe driving condition within the predetermined threshold of time and an in-vehicle alert is activated when the driver has not looked in the direction of the potentially unsafe driving condition within the predetermined threshold of time; and transmitting, by the at least one processor to a remote server located remotely from the vehicle, the first visual data, the second visual data, information about the in-vehicle alert suppression or activation, and information about whether the driver looked in the direction of the potentially unsafe driving condition.

18. The method of claim 17, wherein the in-vehicle alert is an audio alert played through a speaker in the vehicle or a visual alert on a display or a light in the vehicle.

19. The method of claim 17, wherein the amount of time in which the vehicle will encounter the potentially unsafe driving condition is determined based on at least one of a lateral velocity of the vehicle, a speed of the vehicle, a distance from the vehicle to an object associated with the potentially unsafe driving condition, or a speed of the object associated with the potentially unsafe driving condition.

20. The method of claim 19, wherein the object associated with the potentially unsafe driving condition is a lane or road boundary or a second vehicle.

21. The method of claim 17, wherein the determination of whether the driver has looked in the direction of the potentially unsafe driving condition comprises monitoring, by the at least one processor based on the second visual data, at least one of a pose of the driver or a gaze of the driver.

* * * * *